(12) United States Patent
Amick et al.

(10) Patent No.: US 8,177,470 B2
(45) Date of Patent: May 15, 2012

(54) CUTTER DOME FOR RECLAIM SYSTEM

(75) Inventors: Alan C. Amick, Granger, IN (US);
Jared L. Kendall, Edwardsburg, MI (US)

(73) Assignee: Laidig Systems, Inc., Mishawaka, IN (US)

( * ) Notice: Subject to any disclaimer, the term of this patent is extended or adjusted under 35 U.S.C. 154(b) by 575 days.

(21) Appl. No.: 12/394,990

(22) Filed: Feb. 27, 2009

(65) Prior Publication Data
US 2010/0221090 A1  Sep. 2, 2010

(51) Int. Cl.
*B65G 65/46* (2006.01)

(52) U.S. Cl. ............ 414/311; 414/309; 198/550.6

(58) Field of Classification Search ........ 414/306–312; 222/228, 236; 198/666–668, 550.6, 670, 198/671
See application file for complete search history.

(56) References Cited

U.S. PATENT DOCUMENTS

| | | | | |
|---|---|---|---|---|
| 1,274,548 A * | 8/1918 | Holnagel et al. | ........ | 198/582 |
| 2,387,399 A * | 10/1945 | Julyan | ........ | 198/587 |
| 2,551,216 A * | 5/1951 | Martin | ........ | 99/479 |
| 2,890,804 A * | 6/1959 | Smith | ........ | 414/306 |
| 2,944,686 A * | 7/1960 | Church, Jr. | ........ | 414/306 |
| 2,969,156 A * | 1/1961 | Miller et al. | ........ | 414/312 |
| 3,050,201 A * | 8/1962 | Humphrey | ........ | 414/310 |
| 3,064,831 A * | 11/1962 | Cook | ........ | 414/310 |
| 3,067,914 A * | 12/1962 | Ellaby | ........ | 222/227 |
| 3,084,814 A * | 4/1963 | Schaefer | ........ | 414/310 |
| 3,088,606 A * | 5/1963 | Schaefer | ........ | 414/310 |
| 3,233,755 A * | 2/1966 | Glenn | ........ | 414/310 |
| 3,252,597 A * | 5/1966 | Hildebrand | ........ | 414/310 |
| 3,338,434 A * | 8/1967 | Kolze | ........ | 414/307 |
| 3,414,142 A * | 12/1968 | Kolze | ........ | 414/307 |
| 3,456,818 A * | 7/1969 | Massey | ........ | 414/302 |
| 3,487,961 A * | 1/1970 | Neuenschwander | ........ | 366/133 |
| 3,490,617 A * | 1/1970 | Mast et al. | ........ | 414/324 |
| 3,532,232 A * | 10/1970 | Sukup | ........ | 414/287 |
| 3,581,916 A * | 6/1971 | Brumagim | ........ | 414/308 |
| 3,648,860 A * | 3/1972 | Wennberg | ........ | 414/310 |
| 3,714,718 A * | 2/1973 | Sukup | ........ | 34/573 |
| 3,817,407 A * | 6/1974 | Cantenot | ........ | 414/310 |
| 3,851,774 A | 12/1974 | Laidig et al. | | |
| 3,896,943 A * | 7/1975 | Knutsen | ........ | 414/307 |

(Continued)

OTHER PUBLICATIONS

Starvrac, *Planetaire*, http://actionunloaders.com/imprimer/planetaire.html, published at least as early as Feb. 25, 2009.

(Continued)

*Primary Examiner* — Saul Rodriguez
*Assistant Examiner* — Jonathan Snelting
(74) *Attorney, Agent, or Firm* — Workman Nydegger

(57) ABSTRACT

A cutter dome for use with a reclaimer includes a sidewall that at least partially encircles a central axis and that extends from a lower end to an upper end, the sidewall having a lower portion that bounds a first chamber and an upper portion that bounds a second chamber, a collection opening being formed on the lower portion of the sidewall so that a reclaimer, such as an auger, can pass through the collection opening and communicate with the first chamber. A roof is disposed on the upper end of the sidewall so as to cover second chamber, the roof having a first inlet formed thereon. A first passageway is disposed within the second chamber and extends from the first inlet to a first outlet, the first outlet communicating with the first chamber.

24 Claims, 20 Drawing Sheets

U.S. PATENT DOCUMENTS

| | | | | |
|---|---|---|---|---|
| 3,908,839 A * | 9/1975 | Menaut | 414/310 |
| 3,942,657 A * | 3/1976 | Knutsen | 414/312 |
| RE28,991 E | 10/1976 | Laidig et al. | |
| 4,015,734 A | 4/1977 | Laidig | |
| 4,063,654 A * | 12/1977 | Shivvers | 414/309 |
| 4,099,633 A * | 7/1978 | Cantenot | 414/309 |
| 4,103,788 A | 8/1978 | Sutton | |
| 4,217,701 A * | 8/1980 | Mathews | 34/211 |
| 4,220,433 A * | 9/1980 | Feterl | 414/298 |
| 4,264,258 A * | 4/1981 | Klinge | 414/309 |
| 4,314,675 A * | 2/1982 | Grossman | 241/95 |
| 4,330,233 A * | 5/1982 | Weaver | 414/310 |
| 4,377,364 A * | 3/1983 | Weaver | 414/307 |
| 4,386,695 A * | 6/1983 | Olson | 198/661 |
| 4,426,187 A * | 1/1984 | Olson | 414/310 |
| 4,437,806 A * | 3/1984 | Olson | 414/307 |
| 4,462,744 A * | 7/1984 | Rasilainen et al. | 414/311 |
| 4,578,012 A * | 3/1986 | Petit | 414/310 |
| 4,585,385 A * | 4/1986 | Buschbom et al. | 414/311 |
| 4,626,161 A * | 12/1986 | Olson et al. | 414/308 |
| 4,655,666 A * | 4/1987 | Cantenot | 414/310 |
| 4,824,312 A * | 4/1989 | Schiltz | 414/310 |
| 4,867,846 A * | 9/1989 | Fleck | 162/246 |
| 5,082,414 A * | 1/1992 | Taupin | 414/306 |
| 5,348,195 A * | 9/1994 | Pajot | 222/227 |
| 5,468,122 A | 11/1995 | Van Fossen | |
| 2006/0104757 A1* | 5/2006 | Schroder et al. | 414/310 |
| 2008/0131242 A1* | 6/2008 | Duffy et al. | 414/311 |

OTHER PUBLICATIONS

Starvrac, *Hydrovrac*, http://actionunloaders.com/imprimer/hydro.html published at least as early as Feb. 25, 2009.

Starvrac, *Symetrix*, http://actionunloaders.com/imprimer/symetrix.html, published at least as early as Feb. 25, 2009.

Starvrac, *Rotodome*, http://actionunloaders.com/imprimer/rotodome.html, published at least as early as Feb. 25, 2009.

Starvrac, *Rotagrain*, http://actionunloaders.com/imprimer/rotagrain.html, published at least as early as Feb. 25, 2009.

Starvrac, *Focus*, http://actionunloaders.com/imprimer/focus.html, published at least as early as Feb. 25, 2009.

Laidig Systems, Inc., *2098 Dominator, Dome and Super-Silo Systems*, Brochure, published at least as early as Nov. 1, 2006.

Laidig Systems, Inc., *Laidig, Setting the Standards with Innovative Bulk Storage and Reclaim Technology*, Brochure, published at least as early as Nov. 1, 2006.

Laidig Systems Inc., *Track-Driven Silo Reclaim Systems Models 298, 698, 1098*, Brochure, published at least as early as Nov. 1, 2006.

Morillon, *Sign External of Interior Performances, Design and Manufacture of Extractors for the Difficult*, www.cambelt.com/cs/tpl=pr_reclaimer_detail, published at least as early as Feb. 25, 2009.

Cambelt International Corp., *Reclaimer Detail*, published at least as early as Feb. 25, 20009.

Jeffrey Rader, *Circular Screw & TubeFeeder Reclaimers for Wood Chips and Biomass*, www.jeffreyrader.com/storage_reclaim/circular_screw_reclaimer.cfm, published at least as early as Feb. 25, 2009.

Engicon Systems (Pty) Ltd., *Screw Reclaimers*, www.icon.co.za/~engicon/screw.htm, published at least as early as Feb. 25, 2009.

Bruks, Rotofeed, www.bruks.com/en/Products/Handling-Products/Storage/Rotofeed, published at least as early as Feb. 25, 2009.

* cited by examiner

CUTTER DOME FOR RECLAIM SYSTEM

CROSS-REFERENCE TO RELATED APPLICATIONS

Not applicable.

BACKGROUND OF THE INVENTION

1. The Field of the Invention

The present invention relates to cutter domes for use with a reclaim system within a storage vessel.

2. The Relevant Technology

Silos are used for storing bulk material such as grains or powders. The bulk material is typically deposited into the silo through an opening formed at the top of the silo and is removed from the silo through an outlet centrally formed on the floor the silo. Bottom reclaim systems are often mounted on the floor of the silo for controlling movement of the bulk material to the outlet. The bottom reclaim system includes a base mounted adjacent to the outlet and an auger that outwardly projects from the base. The auger rotates about a central longitudinal axis thereof so as to inwardly draw the bulk material from the perimeter of the floor to the outlet. Furthermore, as the auger rotates about its longitudinal axis, the auger also revolves around the central outlet on the silo floor. As a result, the auger draws bulk material to the outlet from all areas on the silo floor.

It is often desirable to have a first-in-first-out (FIFO) inventory control of the bulk material within the silo. This ensures that a portion of the bulk material does not stagnate within the silo. In cases where FIFO is important, it is desirable to have the outlet covered so that the bulk material directly above the outlet does not free flow into the outlet, thereby precluding FIFO inventory control. A solution to this problem has been to position a dome on the floor of the silo that covers the outlet and the base of the reclaim system. The dome has a cylindrical sidewall and a conical roof An opening is formed on the sidewall of the dome through which the auger passes. The auger draws the bulk material through the opening and to the outlet in a controlled manner. The dome prevents the free-flow of bulk material into the outlet, thereby helping to ensure the FIFO storage of the bulk material.

The dome, however, introduces other problems. For example, even though the roof of the dome is conical, the bulk material can post on the roof of the dome. In posting, a significant portion of the entire amount of bulk material within the silo bears its load on a localized region. Specifically, the bulk material can vertically stack on the roof of the dome in a cohesive structure that remains stationary as opposed to flowing out toward the auger. In turn, this stacked bulk material above the roof can bridge outward until it eventually reaches the interior surface of the silo. In this scenario, large cavities can be produced within the silo as the reclaimer removes the freely movable bulk material from below the bridging bulk material.

As a result of the posting of the bulk material on the dome, the dome and reclaimer can be subject to tremendous point-loading caused by the bulk material. That is, whereas the entire weight of the bulk material is typically uniformly carried over the entire floor of the silo, posting of the bulk material causes the weight of a large percentage of the bulk material to be concentrated on the dome. This point loading of the bulk material can result in failure of the dome and/or reclaimer. Furthermore, the stacking and bridging of the bulk material and the resulting formation of cavities precludes efficient operation of the reclaimer and prevents FIFO flow of bulk material within the silo. In some situations, movement of the bulk material within the silo can be completely stopped. In turn, disrupting the stacked bulk material within the silo to restore proper flow of the bulk material can be time consuming and dangerous.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
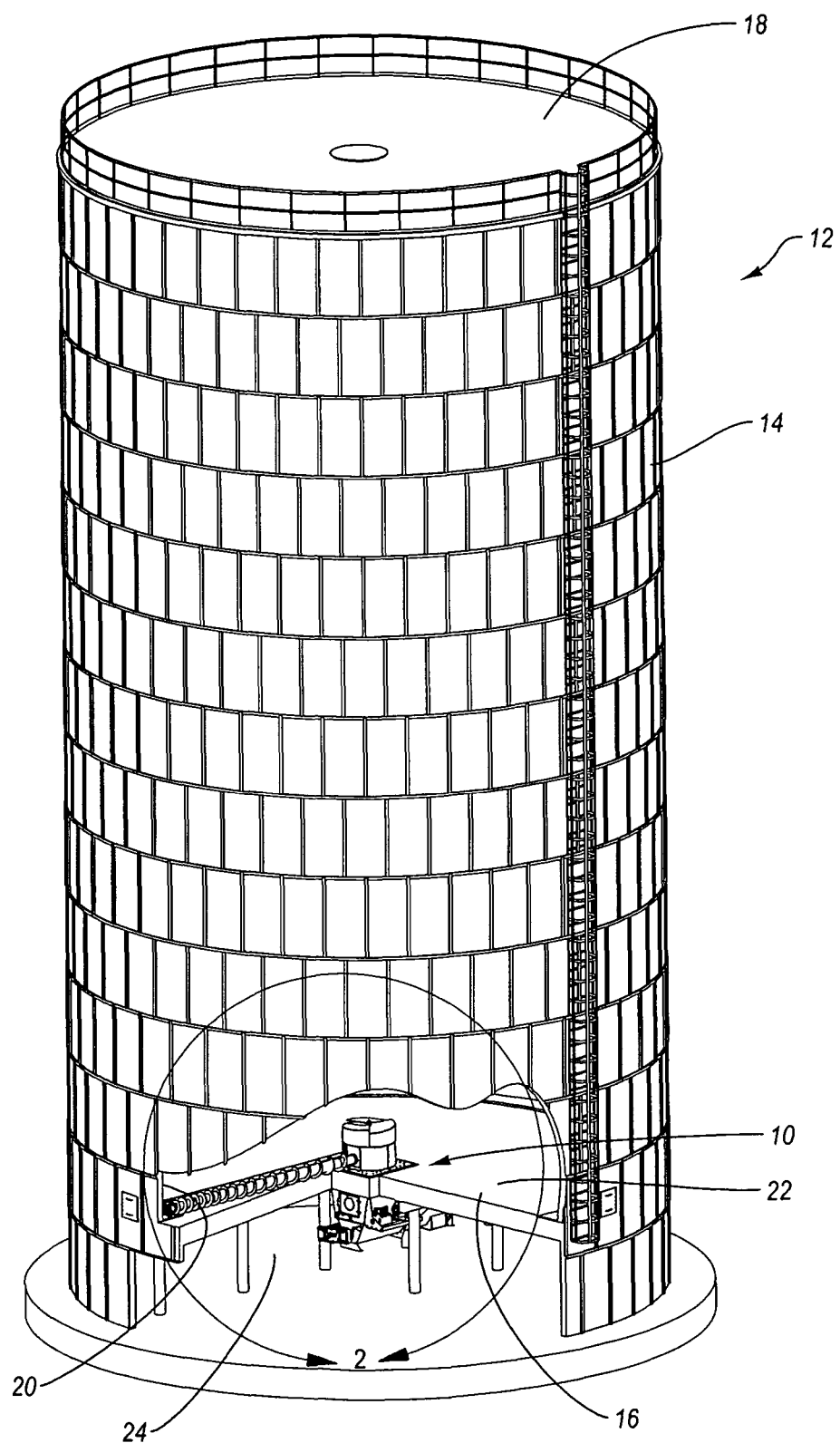
FIG. 1 is a cut away perspective view of a storage vessel housing an inventive reclaim system.

Depicted in FIG. 1 is one embodiment of a reclaim system 10 incorporating features of the present invention and being used in association with a storage vessel 12. Storage vessel 12 is shown as comprising a substantially cylindrical sidewall 14 that extends between a floor 16 and a cap 18. Storage vessel 12 has an interior surface 20 that bounds a compartment 22 that extends between floor 16 and cap 18. An access area 24 is formed below floor 16. Compartment 22 is configured to receive bulk material. As used in the specification and appended claims, the term "bulk material" is broadly intended to include powders, grains, sand, chips, granulated material, and other small diameter material that is capable of flowing under the force of gravity. Bulk materials typically have an average particle diameter size less than about 4 cm, commonly less than about 2 cm, and often less than 1 cm. Common examples of bulk materials include cement, talc, fly ash, salt, chemicals, fertilizers, wood chips, minerals, bauxite, coal, sulfur, beans, grains, such as wheat, barley, corn, oats, and rice, and flour and meal made from beans and grains. A variety of other small diameter materials can also function as bulk materials.

Storage vessel 12 need not have a cylindrical configuration but can have a variety of different sizes, shapes and configurations. As such, storage vessel 12 can comprise a silo, tank, dome, or any other type of building structure that bounds a compartment in which bulk material can be stored. Bulk material is typically fed into compartment 22 through an upper end of storage vessel 12 such as through cap 18 or an upper end of sidewall 14. This feeding can be accomplished through any conventional means such as conveyor belts, pumps, augers, or the like. As will be discussed below in greater detail, the bulk material is removed from compartment 22 through an opening in floor 16. Reclaim system 10 regulates the flow of the bulk material through the opening in floor 16.

Figure 2:
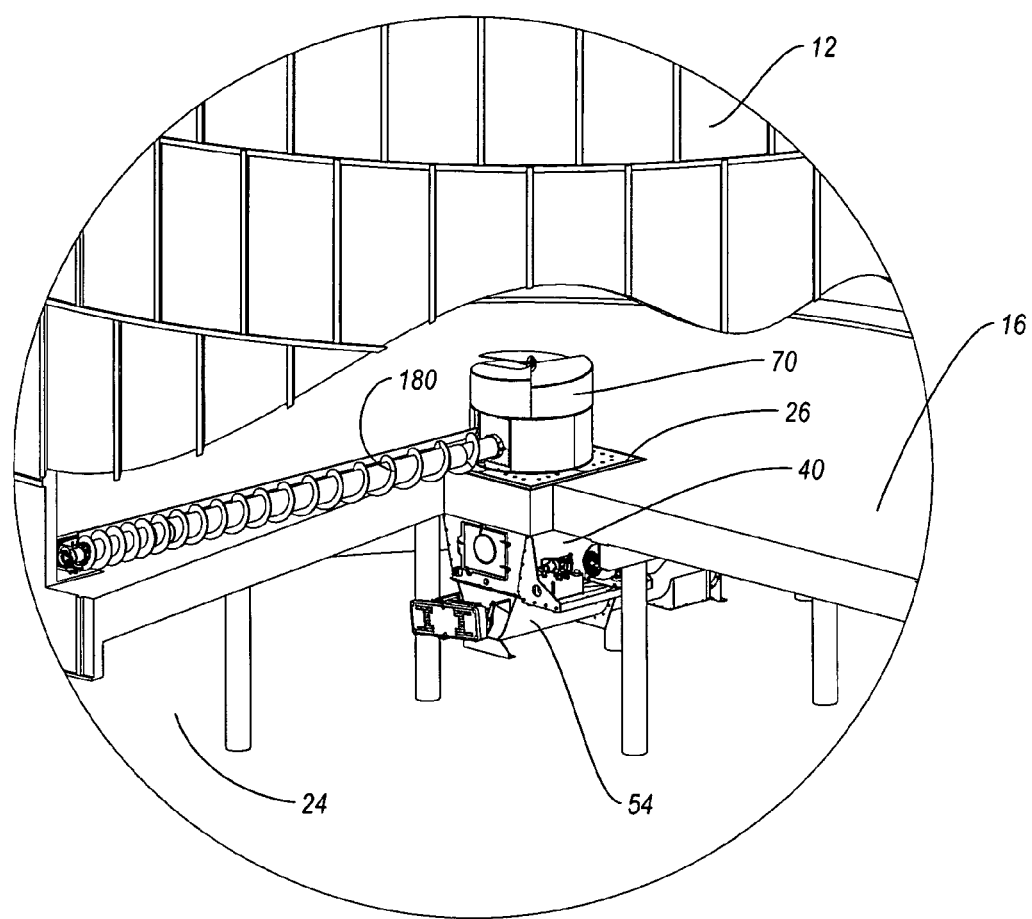
FIG. 2 is an enlarged perspective view of the reclaim system mounted on the floor of the storage vessel shown in FIG. 1.
Figure 3:
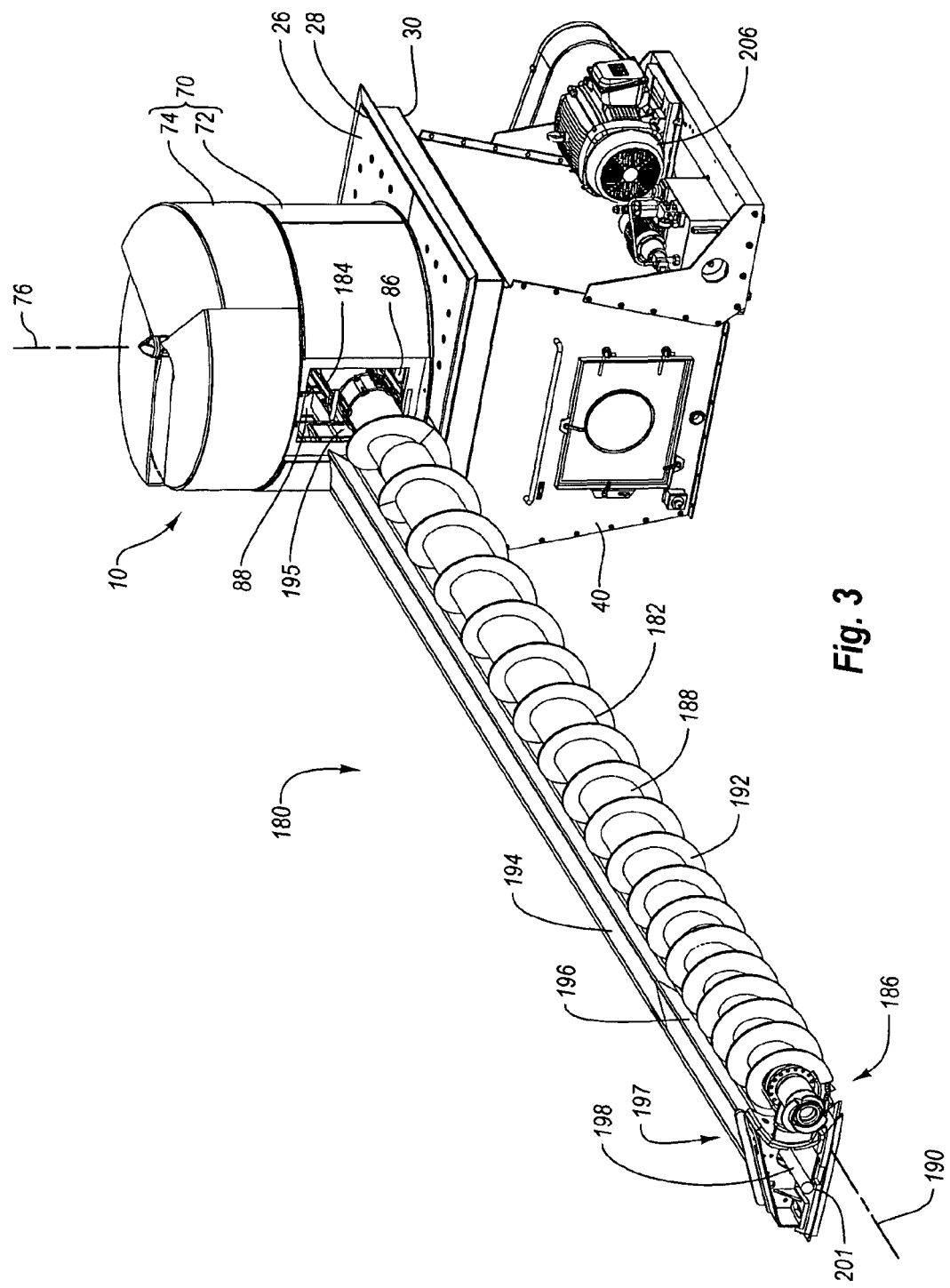
FIG. 3 is an enlarged perspective view of the reclaim system shown in FIG. 2 having a cutter dome.
Figure 4:
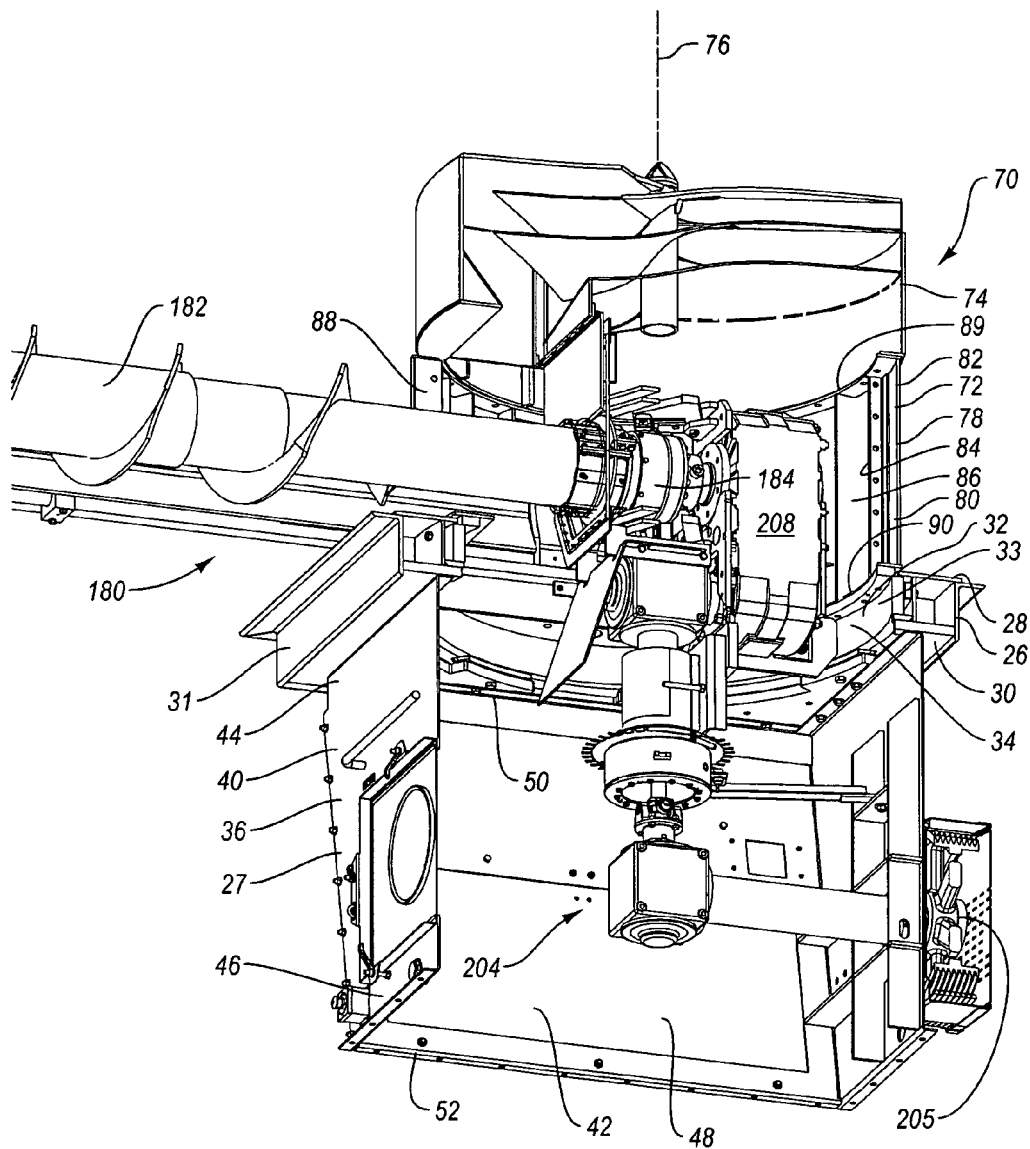
FIG. 4 is a cross sectional side perspective view of the reclaim system with cutter dome shown in FIG. 3.

As depicted in FIG. 2, reclaim system 10 generally comprises a base 26, a hopper 40, a cutter dome 70, and a reclaimer 180. Base 26 is mounted on floor 16. As depicted in FIG. 3, base 26 has a top side 28 and an opposing bottom side 30. As shown in FIG. 4, base 26 has an interior surface 32 that bounds a passage 34 extending therethrough between sides 28 and 30. Passage 34 is the opening through which the bulk material passes out of compartment 22 of storage vessel 12.

In general, base 26 comprises an outer structure 31 that encircles passageway 34 and is rigidly secured to floor 16 of storage vessel 12 (FIG. 1). Base 26 also includes an inner structure 33 that at least partially encircles passageway 34 and is disposed radially inward and/or on top of outer structure 31. Inner structure 33 is movably mounted on outer structure 31 so that inner structure 33 can rotate about passageway 34 relative to outer structure 31. A variety of different structures can be formed between inner structure 33 and outer structure 31 to facilitate smooth and easy movement of inner structure 33. For example, a smooth wear plate, race, or other bearing assembly can be formed between inner structure 33 and outer structure 31. As discussed below in greater detail, cutter dome 70 is mounted on inner structure 33 of base 26 so that cutter dome 70 can also rotate relative to outer structure 31 of base 26.

In the embodiment depicted, outer structure 31 of base 26 is comprised of structural members, such as structural steel, and is mounted on or embedded within floor 16. Floor 16 is typically comprised of reinforced concrete. In alternative embodiments, however, outer structure 31 of base 26 can simply comprise the portion of floor 16 that surrounds passageway 34 extending through floor 16. Inner structure 33 can then be movably secured to floor 16.

Mounted on outer structure 31 of base 26 so as to project below floor 16 and into access area 24 (FIG. 1) is hopper 40. Hopper 40 has an encircling sidewall 36 with an exterior surface 27 and an interior surface 42 that each extend between an upper end 44 and an opposing lower end 46. Interior surface 42 bounds a chamber 48 within hopper 40. An opening 50 is formed at upper end 44 of hopper 40 so that open communication is provided between passage 34 of base 26 and chamber 48 of hopper 40. Likewise, an opening 52 is formed at lower end 46 of hopper 40 in communication with chamber 48. As depicted in FIG. 2, doors 54 can be mounted at lower end 46 of hopper 40 for selectively opening and closing opening 52. Although not depicted, a conveyor belt, transfer pipe, vehicle loading dock, railroad track or other means for transferring the bulk material away from hopper 40 can be disposed below doors 54. As such, when doors 54 are open, bulk material that is transferred into hopper 40 can be deposited on the means for transferring the bulk material so as to convey the bulk material away from storage vessel 12.

Returning to FIG. 3, rotatably mounted on base 26 is cutter dome 70. Although cutter dome 70 is referred to as a "dome," this is simply a term of art and cutter dome 70 need not have a conventional "dome" shaped configuration with an arched roof. Rather, cutter dome 70 can have a substantially cylindrical configuration or a variety of other enclosing configurations. In the embodiment depicted, cutter dome comprises a lower dome portion 72 and an upper dome portion 74. A rotational axis 76, about which cutter dome 70 rotates, centrally extends down through cutter dome 70.

As depicted in FIG. 4, lower dome portion 72 includes a lower sidewall 78 that extends from a lower end 80 to an upper end 82. In the depicted embodiment, lower sidewall 78 has a tubular, cylindrical configuration that at least partially encircles rotational axis 76. Lower sidewall 78 can also have a polygonal, irregular or other configuration. Lower end 80 is mounted on inner structure 33 of base 26 so that cutter dome 70 rotates about rotational axis 76 concurrently with inner structure 33 of base 26. Lower sidewall 78 has an interior surface 84 that bounds a first chamber 86. An inlet opening 89 is formed at upper end 82 while an outlet opening 90 is formed at lower end 80. Outlet opening 90 communicates with passage 34 of base 26 so that bulk material can pass therebetween.

A collection opening 88 is formed through lower sidewall 78 so that fluid communication is provided between compartment 22 of storage vessel 12 (FIG. 1) and first chamber 86. Collection opening 88 can be formed through lower sidewall 78 so that a portion of lower sidewall 78 forms a continuous loop about rotational axis 76. Alternatively, collection opening 88 can be formed by forming a gap in lower sidewall 78 so that lower sidewall 78 has a substantially C-shaped configuration. As will be discussed below in greater detail, a reclaimer, such as an auger, extends through collection opening 88 for drawing bulk material into first chamber 86.

Figure 5:
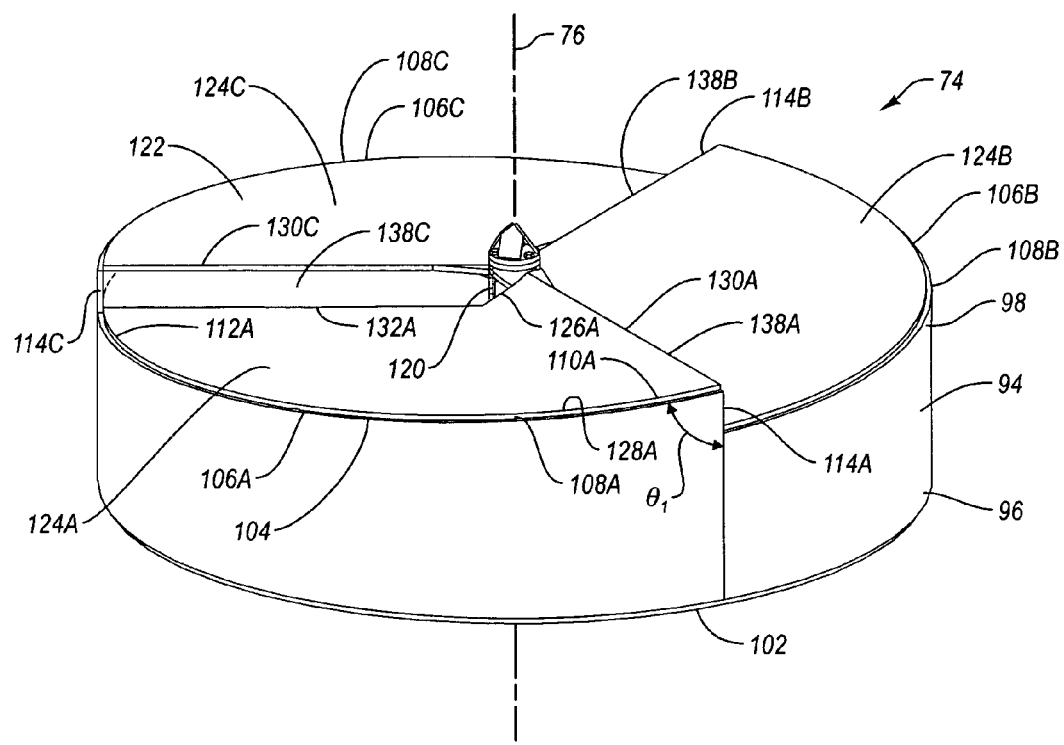
FIG. 5 is a perspective view of an upper portion of the cutter dome shown in FIG. 3.
Figure 6:
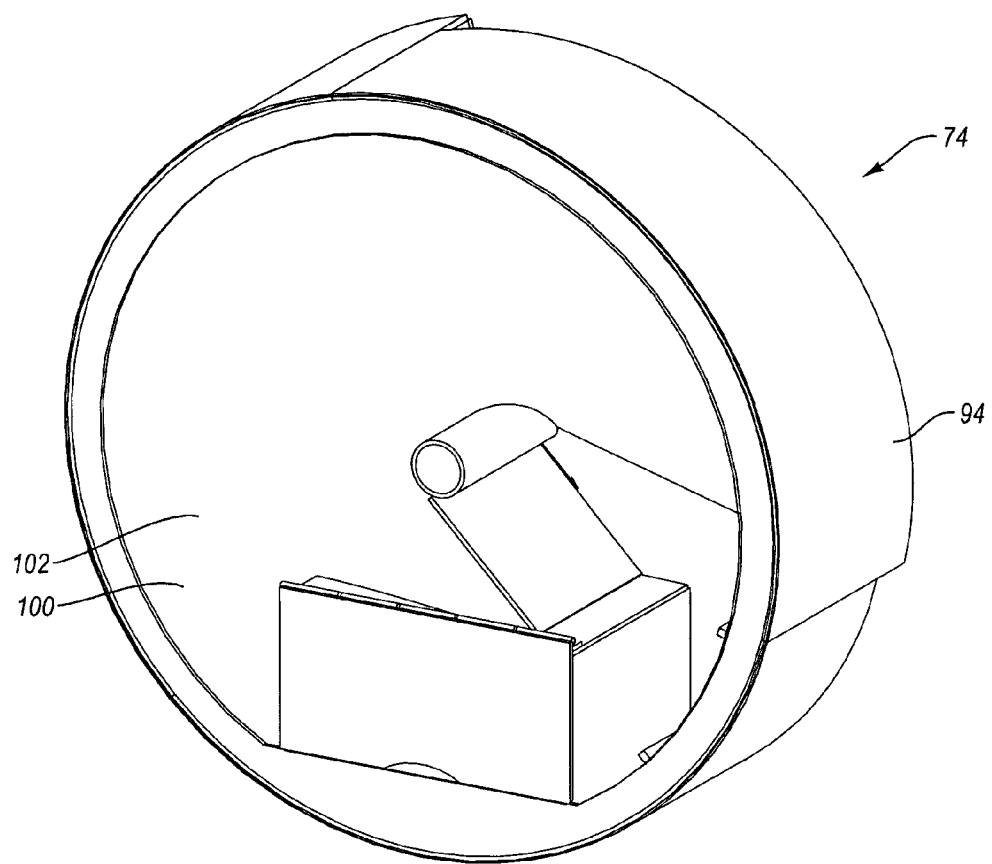
FIG. 6 is a bottom perspective view of the cutter dome portion shown in FIG. 5.

Turning to FIG. 5, upper dome portion 74 comprises an upper sidewall 94 that is mounted on upper end 82 (FIG. 4) of lower sidewall 78 and that extends between a lower end 96 and an upper end 98. Upper sidewall 94 has a substantially cylindrical configuration that completely encircles rotational axis 76. Upper sidewall 94 can also have a polygonal, irregular, or other configuration. As depicted in FIG. 6, upper sidewall 94 has an interior surface 100 that bounds a second chamber 102. Returning to FIG. 5, upper end 98 of upper sidewall 94 terminates at a perimeter edge 104. Perimeter edge 104 is comprised of three equal arced segments 106A-C each having a substantially identical configuration. Arced segment 106A comprises a top edge 108A that extends from a first end 110A to an opposing second end 112A. Top edge 108A has a constant radius relative to rotational axis 76 and downwardly slopes from first end 110A to second end 112A. As a result, first end 110A is positioned higher along rotational axis 76 than second end 112A.

Arced segment 106A also comprises a shoulder 114A that downwardly projects from first end 11A. In one embodiment, shoulder 114A extends in a plane that is parallel to and aligned with rotational axis 76. In alternative embodiments, shoulder 114A can extend in a plane that intersects with rotational axis 76 at an angle. Arced segment 106A can be configured so that an angle $\theta_1$ is formed between top edge 108A and shoulder 114A in a range between about 45° to about 225° with about 65° to about 115° or about 80° to about 110° being more common. Other angles can also be used. It is also appreciated that shoulder 114A need not be straight but can also be curved. Arced segments 106B and 106C have the same configuration as arced segment 106A and are identified by like reference characters. It is noted that the second end 112 of each arced segment 106 intersects with shoulder 114 of the adjacent arced segment 106.

Centrally disposed within second chamber 102 of upper dome portion 74 is a shaft 120 that extends along rotational axis 76. Upper dome portion 74 also comprises a roof 122 that extends between perimeter edge 104 and shaft 120. In the depicted embodiment, roof 122 is comprised of three equal roof segments 124A-C each having substantially the same circular segment configuration. Roof segment 124A comprises an inside edge 126A that is secured to shaft 120, a curved outside edge 128A that extends along top edge 108A of perimeter edge 104, a cutting edge 130A that extends from shaft 120 to first end 110A of top edge 108A, and a back edge 132A that extends from shaft 120 to second end 112A of top edge 108A. Because top edge 108A downwardly slopes as previously discussed, outside edge 128A of roof segment 124A has a complimentary slope. Furthermore, roof segment 128A is curved so that inside edge 126A of roof segment 124A curves along shaft 120 at substantially the same angle as outside edge 128A. This curve is such that if roof segment 124A was extended, segment 124A would encircle shaft 120 in a downwardly extending helical configuration.

Roof segments 124B and 124C are similarly mounted so as to extend between shaft 120 and top edges 108B and 108C, respectively. As a result of the height of shoulders 114A-C, elongated inlets 138A-C are formed between cutting edge 130 of each roof segment 124 and back edge 132 of the adjacent roof segment 124. For example, inlet 138C extends between shoulder 114C and shaft 120 between cutting edge 130C and back edge 132A. The height of inlet 138C depends on the height of shoulders 114A-C and the angle at which the roof segments 124A-C are disposed. Inlets 138A-C provide fluid communication between compartment 22 of storage vessel 12 (FIG. 1) and second chamber 102 of upper dome portion 74.

Figure 7:
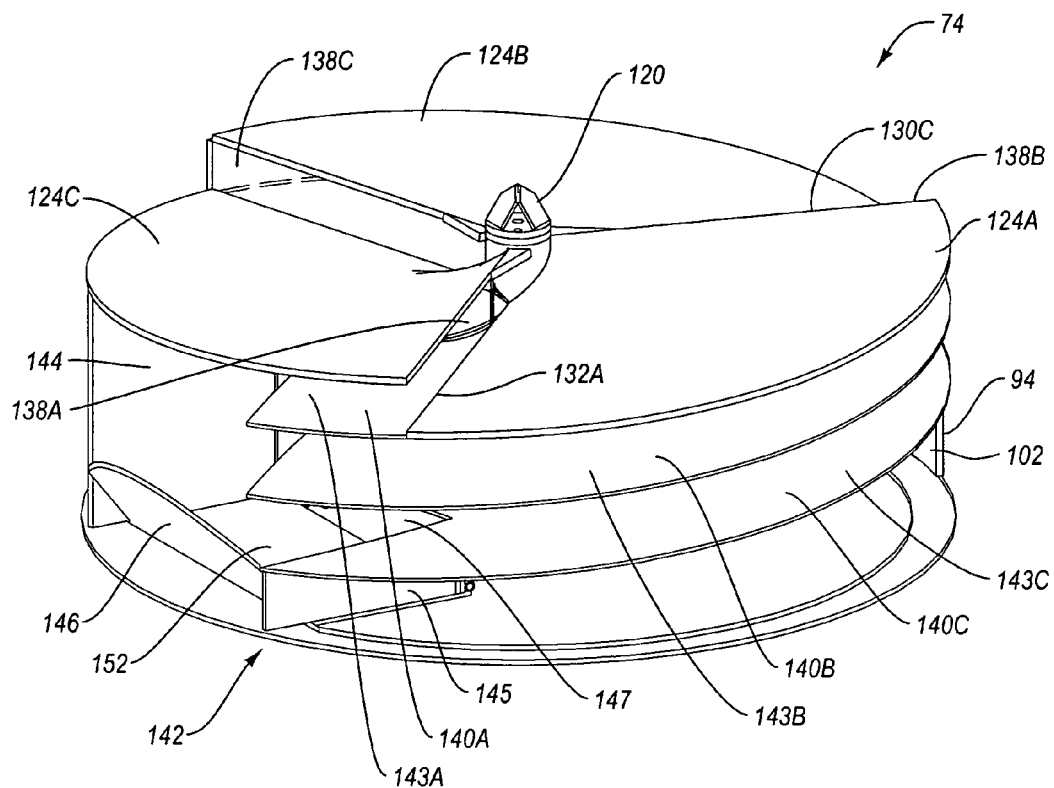
FIG. 7 is a side perspective view of the cutter dome portion shown in FIG. 5 wherein a portion of the sidewall has been removed.

As depicted in FIG. 7, disposed within second chamber 102 are three sloped flutes 140A-C. Each flute 140A-C is disposed between shaft 120 and upper sidewall 94 and extends from the back edge 132 of a corresponding roof segment 124 to a termination point located above a drop box 142 that is formed within second chamber 102. Each flute 140A-C downwardly slopes in a helical path about shaft 120. Furthermore, each flute 140A-C partially bounds a corresponding passageway 143A-C through which the bulk material travels as it passes from a corresponding inlet 138A-C to drop box 142. Each passageway 143A-C also downwardly slopes in a helical path about shaft 120.

Figure 7A:
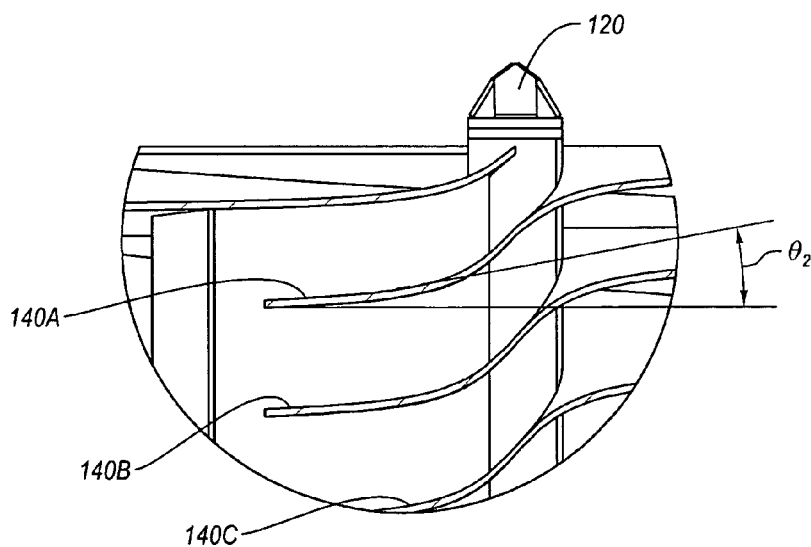
FIG. 7A is a side view of the flutes of the cutter dome portion shown in FIG. 7.

Each flute 140A-C slopes down toward drop box 142 so that the bulk material travels downward as cutter dome 70 is rotated. However, flutes 140A-C are typically disposed at an angle less than the angle of repose of the bulk material within compartment 22 of storage vessel 12. This helps prevent the bulk material from freely flowing down passageways 143A-C. As depicted in FIG. 7A, each flute 140A-C typically slopes at an angle $\theta_2$, which is relative to a plane that is normal to rotational axis 76, that is in a range between about 5° to about 30° and more commonly in a range between about 10° to about 20°. Other ranges can also be used. The bulk material typically has an angle of repose within compartment 22 that is greater than about 30° relative to the horizontal.

Returning to FIG. 7, drop box 142 comprises a first partition wall 144 that extends along the height of upper sidewall 94, an opposing second partition wall 145 that downwardly projects from the terminal end of flute 140C, an outside partition wall 146 that slopes inwardly and extends between the outside ends of partition walls 144 and 145, and an inside partition wall 147 that extends between the inside ends of partition walls 144 and 145. The partition walls 144-147 bound an outlet 152 that provides fluid communication between first chamber 86 of lower dome portion 72 (FIG. 4) and second chamber 102 of upper dome portion 74. A door 154 (FIG. 10) is hingedly mounted on inside partition wall 147 and can be used for selectively opening and closing outlet 152.

As will be discussed below in greater detail, during operation cutter dome 70 is rotated on base 26 about rotational axis 76. As cutter dome 70 is rotated, the bulk material sitting on roof 122 passes into inlets 138A-C, travels down passageways 143A-C, and passes through outlet 152 in drop box 142 into first chamber 86 of lower dome portion 72. The bulk material then travels down through passage 34 in base 26 and into chamber 48 of hopper 40. The fact that inlets 138A-C are positioned below cutting edges 130A-C enables cutting edges 130A-C to efficiently cut away at the bulk material as cutter dome 70 is rotated, thereby ensuring that the bulk material is fed into passageways 143A-C.

Is appreciated that cutter dome 70 can come in a variety of different configurations. By way of example and not by limitation, in the depicted embodiment upper dome portion 74 is separately formed and secured to lower dome portion 72 such as by bolting, welding, or the like. In an alternative embodiment, it is appreciated that the lower sidewall 78 and upper sidewall 94 can be formed from one or more continuous members that extend the full height of lower sidewall 78 and upper sidewall 94. Likewise, the depicted embodiment includes three inlets 138A-C and three separate flutes 140A-

C. In alternative embodiments, cutter dome 70 can be formed from a single inlet 138 and a single flute 140 or, alternatively, from two or four or more inlets 138 and flutes 140.

In still other embodiments, shoulders 114A-C can be eliminated so that roof 122 is substantially flat. Inlets 138A-C can be formed on flat roof 122 leading to passageways 143A-C. In contrast to roof 122 being flat, roof 122 can be conical, domed shaped, semi-spherical or any other configuration. In each of these different configurations, shoulders 114A-C can be formed so as to expose cutting edges 130A-C or shoulders 114A-C can be eliminated so that inlets 138A-C are formed flat on the roof surface.

Furthermore, in the depicted embodiment flutes 140A-C are secured to roof segments 124A-C such as by welding, bolting or other conventional methods. In alternative embodiments, each roof segment 124A-C can be integrally formed as a unitary member with a corresponding flute 140A-C. Furthermore, each flute 140A-C is shown as only partially encircling shaft 120. In alternative embodiments, each flute 140A-C can form one or more complete helical revolutions about shaft 120. Further alternative embodiments will be discussed below in greater detail.

Returning to FIG. 3, in the depicted embodiment reclaimer 180 comprises an elongated auger 182 having a first end 184 that is disposed within the first chamber 86 and an opposing second end 186 that is disposed outside of cutter dome 70 but within storage vessel 12. Auger 182 comprises a central shaft 188 having a central longitudinal axis 190 extending along the length thereof and one or more threads 192 helically encircling and extending along the length of shaft 188. Auger 182 passes out of first chamber 86 by passing through collection opening 88.

Figure 20:
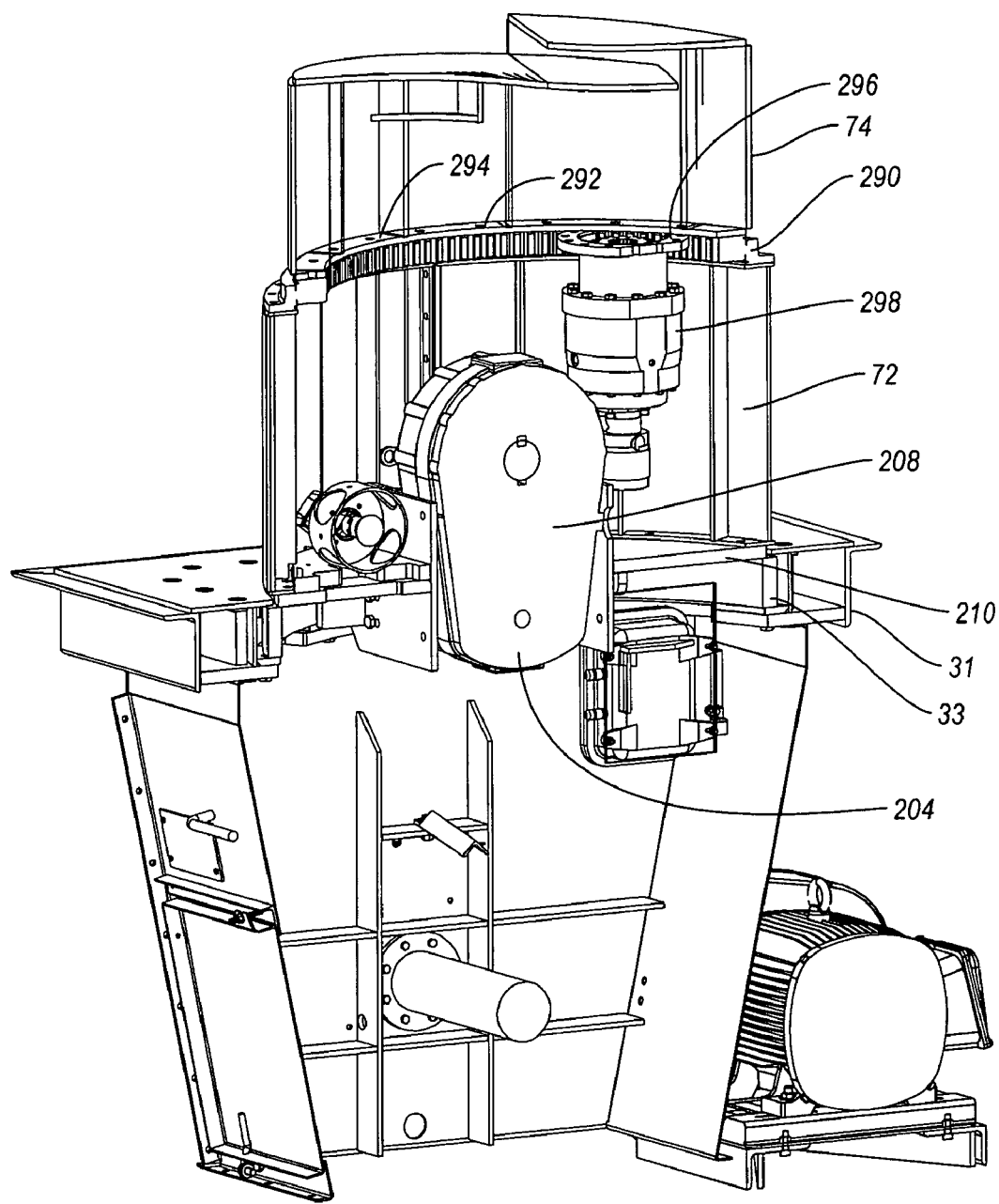
FIG. 20 is a cross sectional side perspective view of an alternative embodiment of a reclaim system having a cutter dome wherein an upper portion of the cutter dome is rotatable independent of a lower portion of the cutter dome.

As depicted in FIG. 4, disposed within chamber 48 of hopper 40 and first chamber 86 of lower dome portion 72 is a drive train 204. Drive train 204 has a first end 205 that is coupled by a belt to a drive motor 206 (FIG. 3). Drive train 204 has an opposing second end 208 that is coupled with first end 184 of auger 182. As such, drive motor 206 and drive train 204 facilitate rotation of auger 182 about axis 190 (FIG. 3) which in turn causes auger 182 to draw the bulk material into collection opening 88. As depicted in FIG. 20, second end 208 of drive train 204 and first end 184 of auger 182 (FIG. 3) are supported by support members 210 that extend from inner structure 33 of base 26 to drive train 204. As such, second end 208 of drive train 204 and first end 184 of auger 182 rotate concurrently with inner structure 33 of base 26 and cutter dome 70 about rotational axis 76.

As shown in FIG. 3, disposed parallel to and extending along the length of auger 182 is a support arm 194. Support arm 194 has a first end 195 disposed within first chamber 86 and an opposing second end 197 disposed adjacent to second end 186 of auger 182. Second end 186 of auger 182 is rotatable mounted to second end 197 of support arm 194 to provide structural stability to auger 188. Furthermore, support arm 194 has an inside face 196 having a concave configuration and that extends along auger 182. Inside face 196 helps to capture bulk material between threads 192 and inside face 196 so that the bulk material is efficiently drawn down along the length of auger 182 and into collection opening 88.

Figure 8:
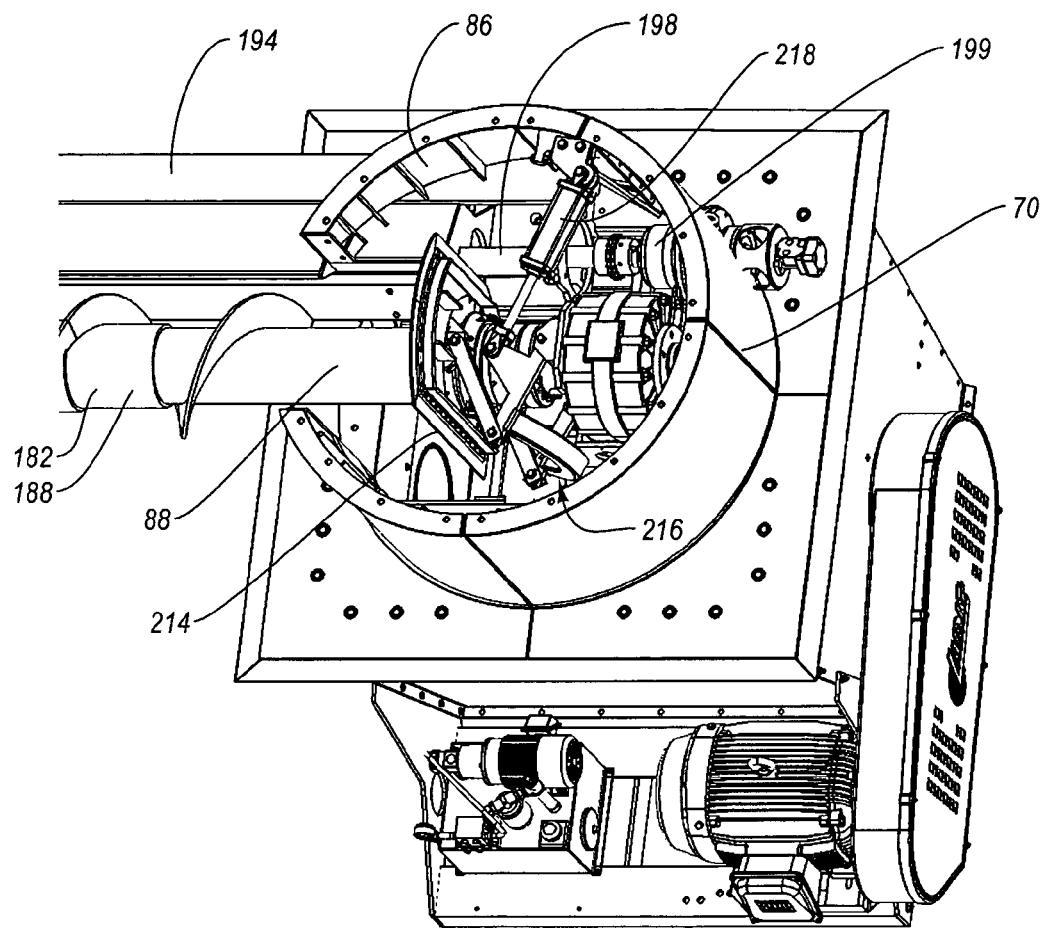
FIG. 8 is a top perspective view of the reclaim system shown in FIG. 3 with a door of the cutter dome in an open position.

As better depicted in FIG. 8, a drive shaft 198 is disposed within and extends along the length of support arm 194. Drive shaft 198 is rotated by a motor 199. Returning to FIG. 3, drive shaft 198 has a distal end 201 located at second end 197 of support arm 194. Distal end 201 couples with a track, such as through the use of a gear. The track is formed on the interior surface of 20 of storage vessel 12 adjacent to floor 16 so as to encircle floor 16. Alternatively, the track can be formed on floor 16 at the perimeter edge thereof so as to encircle floor 16. Drive shaft 198 is engaged with the track so that rotation of drive shaft 198 causes distal end 210 of drive shaft 198 to slowly move along the length of the track. In turn, this movement of drive shaft 198 causes second end 197 of support arm 194 and second end 186 of auger 182 to also move along the track. In turn, movement of the second end of support arm 194 and auger 182 along the track facilitates the rotation of second end 208 of drive train 204, first end 184 of auger 182, inner structure 33 of base 26, and cutter dome 70 to concurrently rotate about rotational axis 76.

Reclaimer 180, hopper 40, base 26 and the drive systems disclosed herein can be purchased from Laidig Systems, Inc. located in Mishawaka, Indiana. In alternative embodiments, it is appreciated that other conventional reclaimers, hoppers, bases and drive systems can be used with the inventive cutter domes of the present invention. For example, in contrast to reclaimer 180 comprising an auger, reclaimer 180 can comprise different rotating screw configurations, belt conveyors with or without paddles, chain conveyors, and other types of continuous dragging or transport systems that are commonly used for movement of bulk material and which could function for moving bulk material into first chamber 86.

Figure 9:
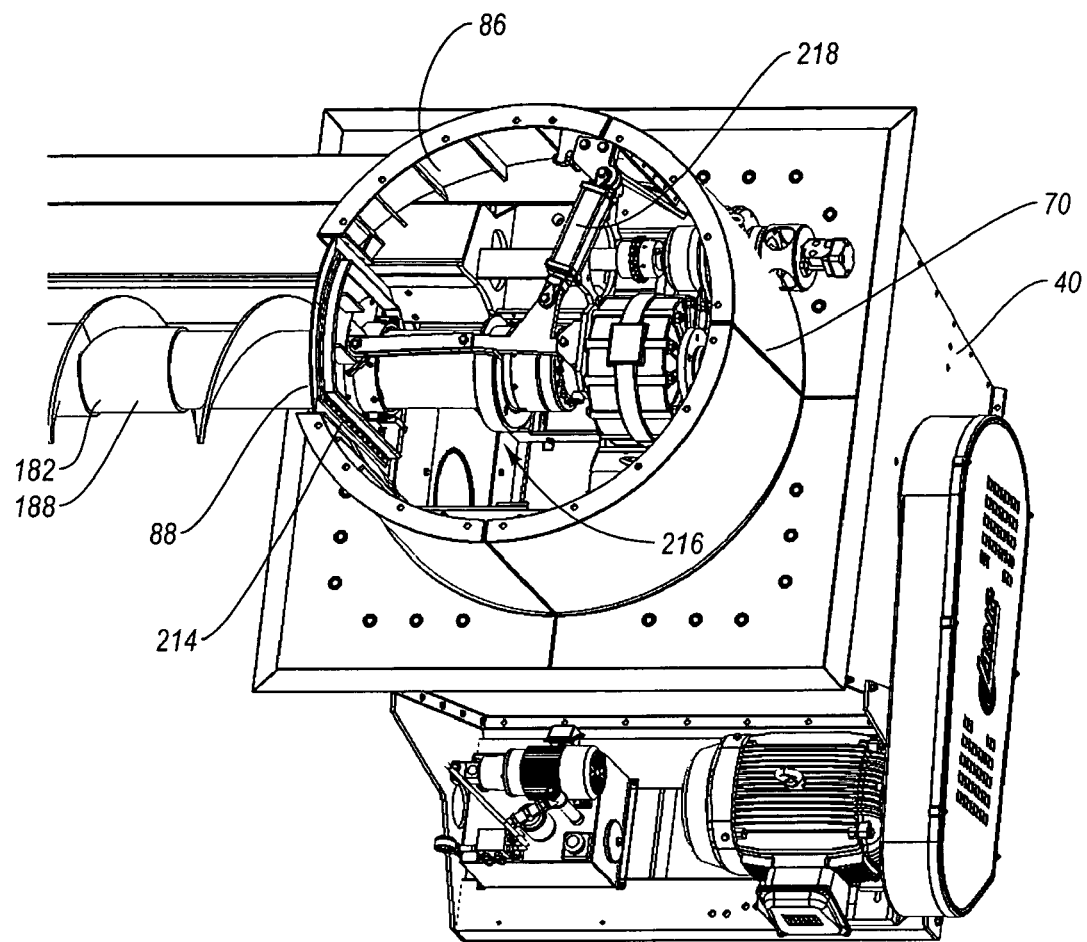
FIG. 9 is a top perspective view of the reclaim system shown in FIG. 8 wherein the door is in a closed position.

Turning to FIGS. 8 and 9, a door 214 encircles shaft 188 of auger 182 and can selectively move along shaft 188. Door 214 is moveable between an open position and a closed position. In the open position shown in FIG. 8, door 214 is drawn back from collection opening 88 into first chamber 86 so that bulk material can be drawn into cutter dome 70 through collection opening 88 during rotation of auger 182. In the closed position shown in FIG. 9, door 214 is moved forward so as to close off collection opening 88. The closing of collection opening 88 through the use of door 214 enables cutter dome 70 and hopper 40 to be emptied of bulk material so that cutter dome 70 and hopper 40 can be accessed through hopper 40 for maintenance and/or repair of components therein. Door 214 is selectively moved between the open and close position as a result of a linkage 216 operated by a hydraulic piston 218. Linkage 216 used to close door 214 cams over, thereby locking door 214 into position in case of hydraulic pressure loss. Other mechanisms can also be used for selectively opening and closing door 214.

Figure 10:
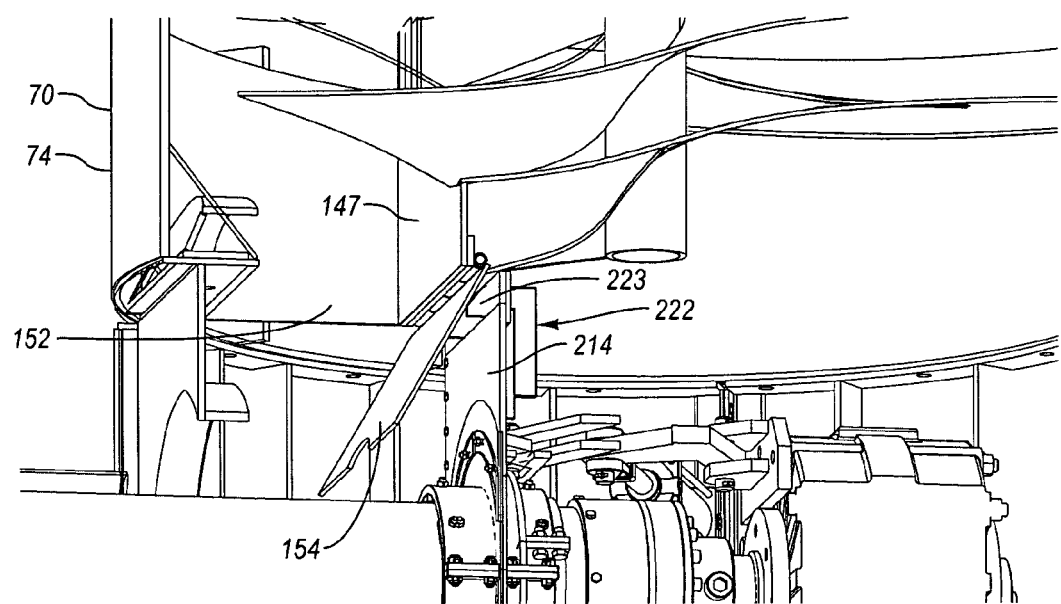
FIG. 10 is a cross sectional side view of the cutter dome with a door for the upper dome portion in a partially open position.

Turning to FIG. 10, the opening and closing of door 214 also facilitates selective opening and closing of door 154 that selectively covers outlet 152 of upper dome portion 74. Specifically, as previously discussed, door 154 is hingedly mounted to inside partition wall 147. When door 214 is moved to the open position, the force of gravity enables door 154 to rotate downward into an open position so that bulk material can pass through outlet 152. As door 154 is moved to the closed position, a top end 222 of door 214 pushes against door 154 causing it to rotate upward into a closed position and thereby close off outlet 152. When door 214 is in the close position, top end 222 of door 214 pushes against door 154 so as to prevent unwanted opening of door 154. If desired, tapered rams 223 or other structures can be formed at top end 222 of door 214 to help facilitate closing of door 154. Again, the closing of door 154 is desirable so that all the bulk material can be removed from within cutter dome 70 and hopper 40 for accessing the mechanisms therein.

It is appreciated that in alternative embodiments door 154 can be opened using a variety of different mechanisms such as screw drives, hydraulic pistons or a variety of other conventional systems. As such, doors 154 and 214 can be opened and closed separate from each other. The present design, however, elements the need for a second drive mechanism to close door 154, ensures concurrent closure of both doors, and provides an easy retrofit of adding an upper dome portion 74 on an existing lower dome portion 72.

During operation, doors 214 and 154 are each moved to the open position. Auger 182 begins to rotate about rotational axis 190 so as to draw the bulk material through collection opening 88 and into first chamber 86 of cutter dome 70. Simultaneously, cutter dome 70 and auger 182 begin to slowly rotate about rotational axis 76 as a result of the rotation of drive shaft 198. Cutter dome 70 and auger 182 typically rotate at a rate of about 1-3 degrees per minute although other rates can also be used. The movement of auger 182 over floor 16 ensures a uniform draw down of the bulk material over floor 16 of storage vessel 12. As cutter dome 70 is rotated, the bulk material positioned above cutter dome 70 is drawn into inlets 138A-C where it passes down through second chamber 102 and into first chamber 86 through outlet 152.

The removal of the bulk material from above cutter dome 70 helps to maintain movement of the bulk material directly above cutter dome 70. As a result, the bulk material is precluded from setting up or becoming stationary, thereby precluding "posting" or "bridging" of the bulk material above cutter dome 70. Furthermore, the slow rotation of cutter dome 70 controls the material flow such that "rat holing" does not develop. Angling the flutes at an angle lower than the angle of repose of the bulk material also preclude unwanted free flow of material. The majority of the bulk material is collected through collection opening 88. As a result, the bulk material is primarily processed through storage vessel 12 in a first-in-first-out inventory.

Once the bulk material passes into first chamber 86 from either collection opening 88 or through cutter dome 70, the bulk material flows under the force of gravity through passageway 34 in base 26 and into chamber 48 of hopper 40. The bulk material is then transferred out of hopper 40 through doors 54 using any conventional means such as trucks, conveyor belts, pumps, or the like.

Figure 11:
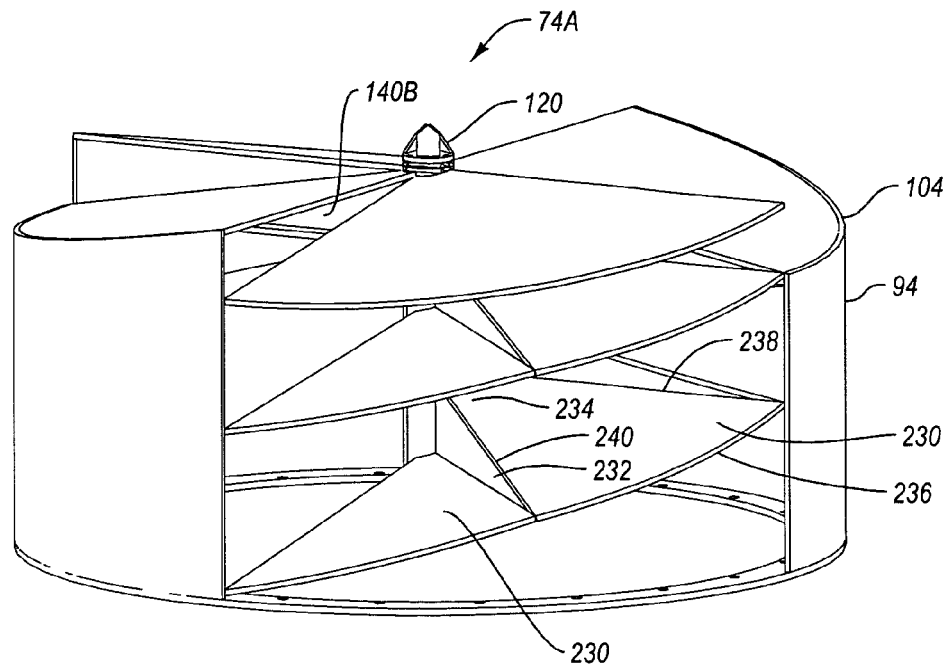
FIG. 11 is a side perspective view of an alternative embodiment of a cutter dome portion formed of flat flutes wherein a portion of the sidewall is removed.

Depicted in FIG. 11 is an alternative embodiment of an upper dome portion 74A of cutter dome 70. Like elements between upper dome portion 74 and 74A are identified by like reference characters. In upper dome portion 74, roof segments 124A-C and flutes 140A-C are bent or contoured so as to extend in a smooth helical path. In upper dome portion 74A, each roof segment 124A-C is comprised of a flat plate in the form of a circular segment that extends from shaft 120 to perimeter edge 104. As a result, each inlet 138A-C has a substantially triangular configuration.

With regard to flutes 140A-C that extend in a helical path along shaft 120, to maintain the helical orientation while maintaining the use of only flat plates, the flutes 140A-C are comprised of a series of flat circular segment plates 230 having a configuration similar to the flat roof segments 124A-C. Each segment plate 230 has an inside edge 234 that is connected to shaft 120, an opposing arced outside edge 236 that connects to sidewall 94, and a first edge 238 and an opposing second edge 240 extending therebetween. Plates 230 are secured in sequential order with outside edges 236 being aligned longitudinally and adjacent inside edges 234 being vertically staggered along shaft 120. A triangular riser 232 extends between second edge 240 of one plate 230 and first edge 238 of the adjacent plate 230, thereby forming a stepped helical path about shaft 120.

Figure 12:
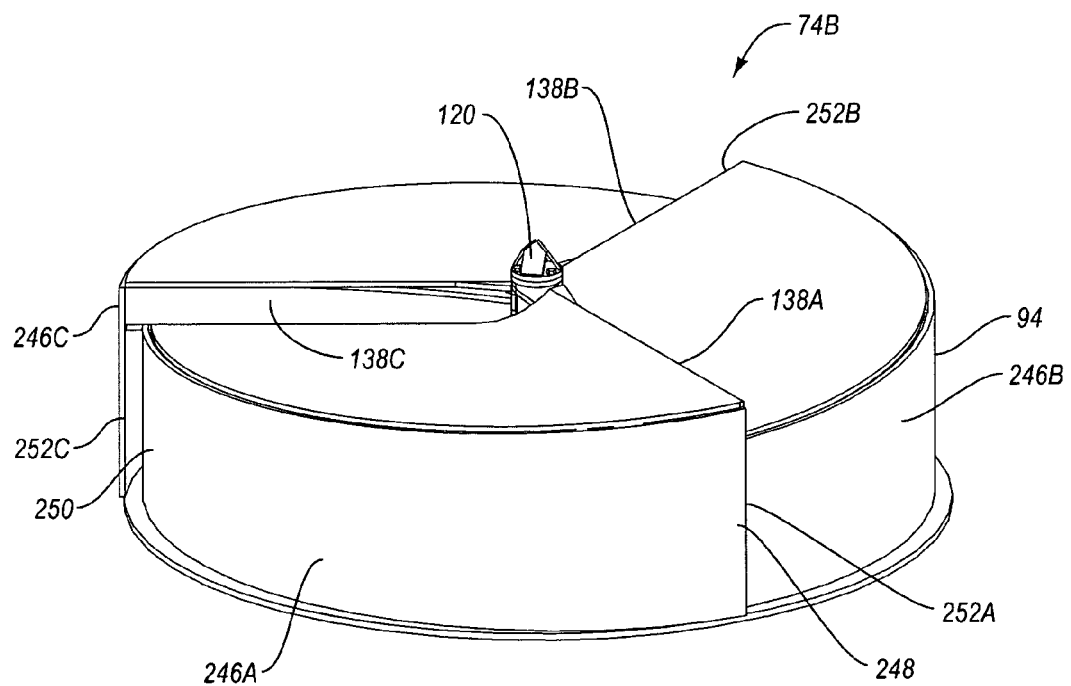
FIG. 12 is a side perspective view of another alternative embodiment of a cutter dome portion having radially outwardly projecting inlets.

In the upper dome portion 74 depicted in FIG. 5, inlets 138A-C extended only along roof 122. In alternative embodiments, upper dome portion 74 can also be formed so that the inlets for receiving the bulk material project out beyond upper sidewall 94. By way of example and not by limitation, depicted in FIG. 12 is an alternative embodiment of an upper dome portion 74B of cutter dome 70 where like elements are identified by like reference characters. In this embodiment, upper sidewall 94 is formed from three sidewall sections 246A-C. Each sidewall section 246 extends from a leading edge 248 to a tail edge 250. Each sidewall section 246A-C radially inwardly curves toward shaft 120 as it extends between ends 248 and 250. As a result, leading end 248 has a radius from shaft 120 that is greater than the radius between shaft 120 and tail edge 250. As a result of this configuration, inlets 138A-C now outwardly project beyond the adjacent sidewall section 246. Furthermore, elongated inlets 252A-C extends along the length of each sidewall section 246. This inlet again captures bulk material and transfers it into first chamber 86 as cutter dome 70 is rotated.

Figure 13A:
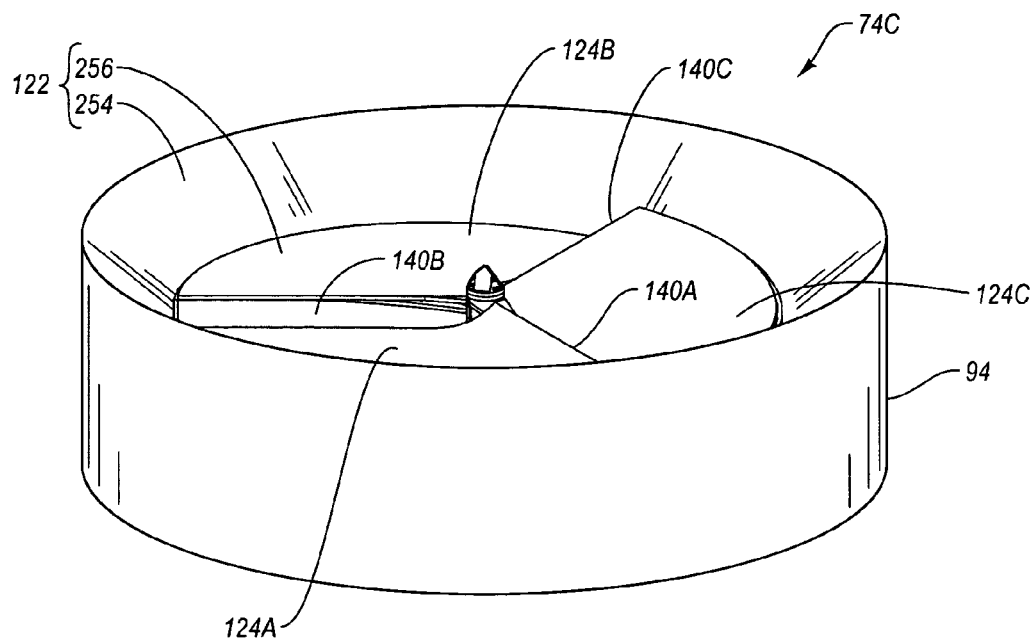
FIG. 13A is a side perspective view of an alternative embodiment of a cutter dome portion having a frusticonical roof portion that slopes radially inward.

In the previous depicted embodiments, inlets 138A-C extended all the way to upper sidewall 94. In alternative embodiments, however, the inlets 138A-C need not extend all the way to sidewall 94. For example, depicted in FIG. 13A is a further embodiment of an upper dome portion 74C of cutter dome 70 where like elements are identified by like reference characters. Upper dome portion 74C includes upper sidewall 94. However roof 122 comprises an outer roof portion 254 and an inner roof portion 256. Outer roof portion 254 has a frusticonical configuration that slopes down and radially inward toward inner roof portion 256. In turn, inner roof portion 256 comprises roof segments 124A-C as previously discussed with regard to upper dome portion 74. In this regard, outer roof 254 functions to funnel bulk materials down to inner roof portion 256 which in turn transfers the bulk material to first chamber 86.

Figure 13B:
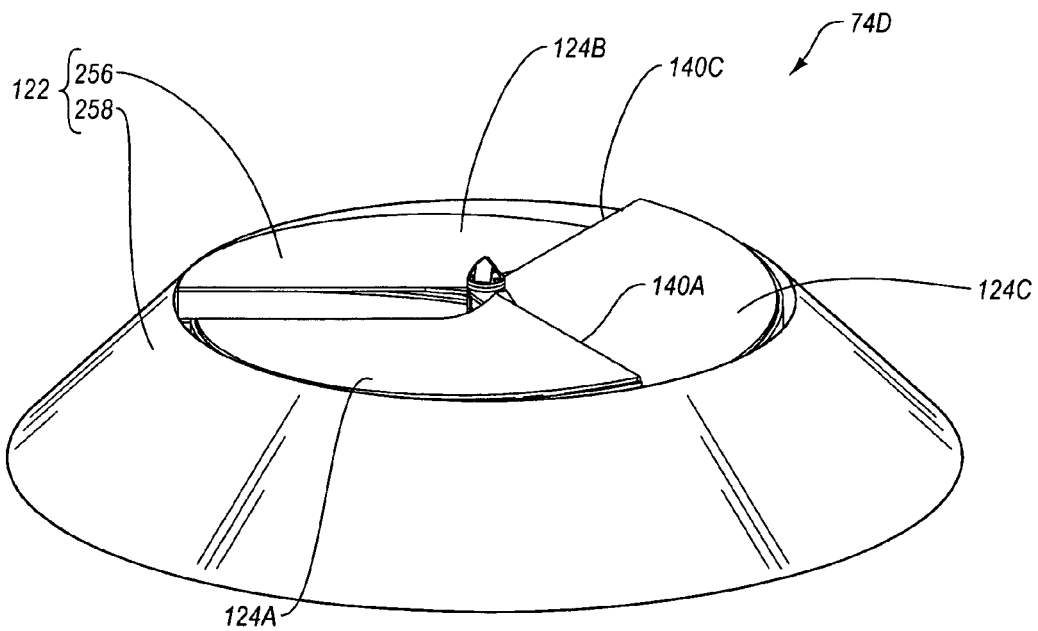
FIG. 13B is a side perspective view of alternative embodiment of a cutter dome portion having a frusticonical roof portion that slopes radially outward.

Depicted in FIG. 13B is a further alternative embodiment of an upper dome portion 74D. Upper dome portion 74D is substantially the same as upper dome portion 74C except that outer roof portion 254 has been replaced with an outer roof portion 258. Outer roof portion 258 also has a frusticonical configuration but slopes down and away from inner roof portion 256. As a result, outer roof portion 258 facilitates moving the bulk material off of cutter dome 70. In both of the above embodiments, it is appreciated that the inner and outer roof portions can rotate concurrently with each other and with lower dome portion 72. Alternatively, inner roof portion 256 can rotate independent of the outer roof portion and/or lower dome portion 72. For example, a drive motor can be used to rotate inner roof portion 256 at a speed greater than lower dome portion 72.

Figure 14:
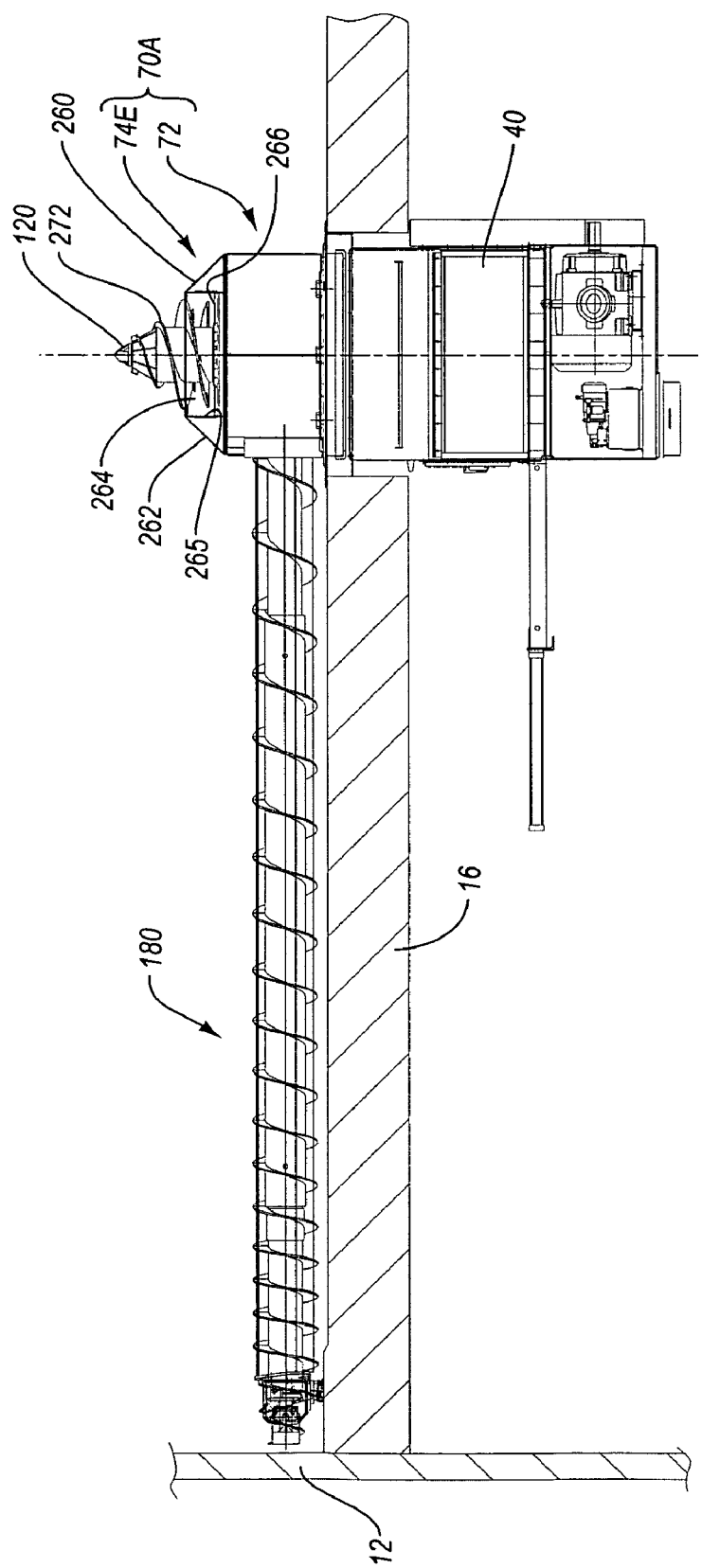
FIG. 14 is a cross section side view of an alternative embodiment of a reclaim system having a cutter dome with an exposed central shaft and encircling flutes.
Figure 15:
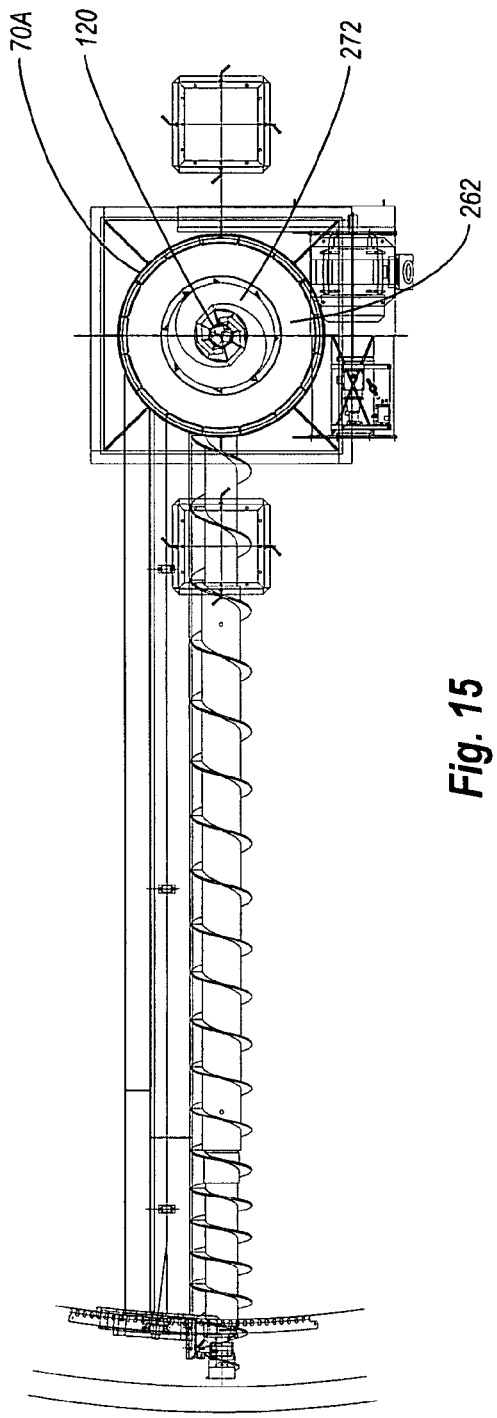
FIG. 15 is a top plan view of the reclaim system shown in FIG. 14.
Figure 16:
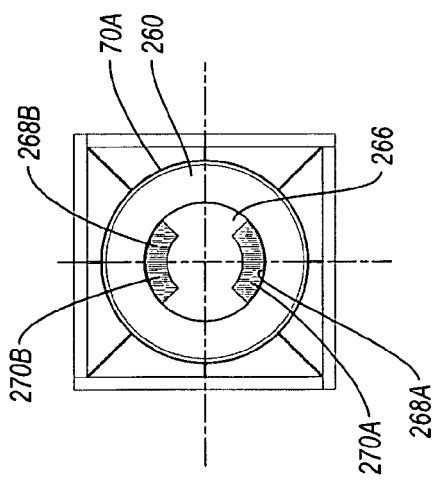
FIG. 16 is a top plan view of the roof of the reclaim system shown in FIG. 14 without the shaft.

Depicted in FIGS. 14 and 15 is an alternative embodiment of a cutter dome 70A wherein like elements are identified by like reference characters. Cutter dome 70A comprises lower dome portion 72 and an upper dome portion 74E. Upper dome portion 74E comprises a roof 260 mounted on lower dome portion 72. Roof 260 comprises a circular frusticonical sidewall 262 that slopes radially inwardly and up to a central recess 264. Recess 264 is bounded by a circular sidewall 265 and a floor 266. As depicted in FIG. 16, floor 266 has a pair of openings 268A and B which are selectively opened and closed by doors 270A and B. Although not shown, it is appreciated that openings 268A and B connect by passageways to drop box 142 (FIG. 7).

Returning to FIG. 14, extending through floor 270 is shaft 120. One or more flutes 272 are helically formed on the exterior of shaft 120. Flutes 272 projects out so as to be adjacent to sidewall 265 of recess 264. As a result, flutes 272 block the free flow of bulk material into openings 268A and B. Again, during operation, lower dome portion 72 and upper dome portion 74 can rotate concurrently so that as shaft 120 is rotated, the bulk material passes down along flutes 272 and into openings 268A and B. Alternatively, a separate drive motor within lower dome portion 72 can be used to selectively rotate shaft 120 independent of lower dome portion 72 and roof 260. In an alternative embodiment for cutter dome 70A, it is also appreciated that roof 260 can be configured similar to outer roof portion 254 (FIG. 13A) so that the bulk material is funneled toward recess 264 as opposed to away from recess 264.

Figure 17:
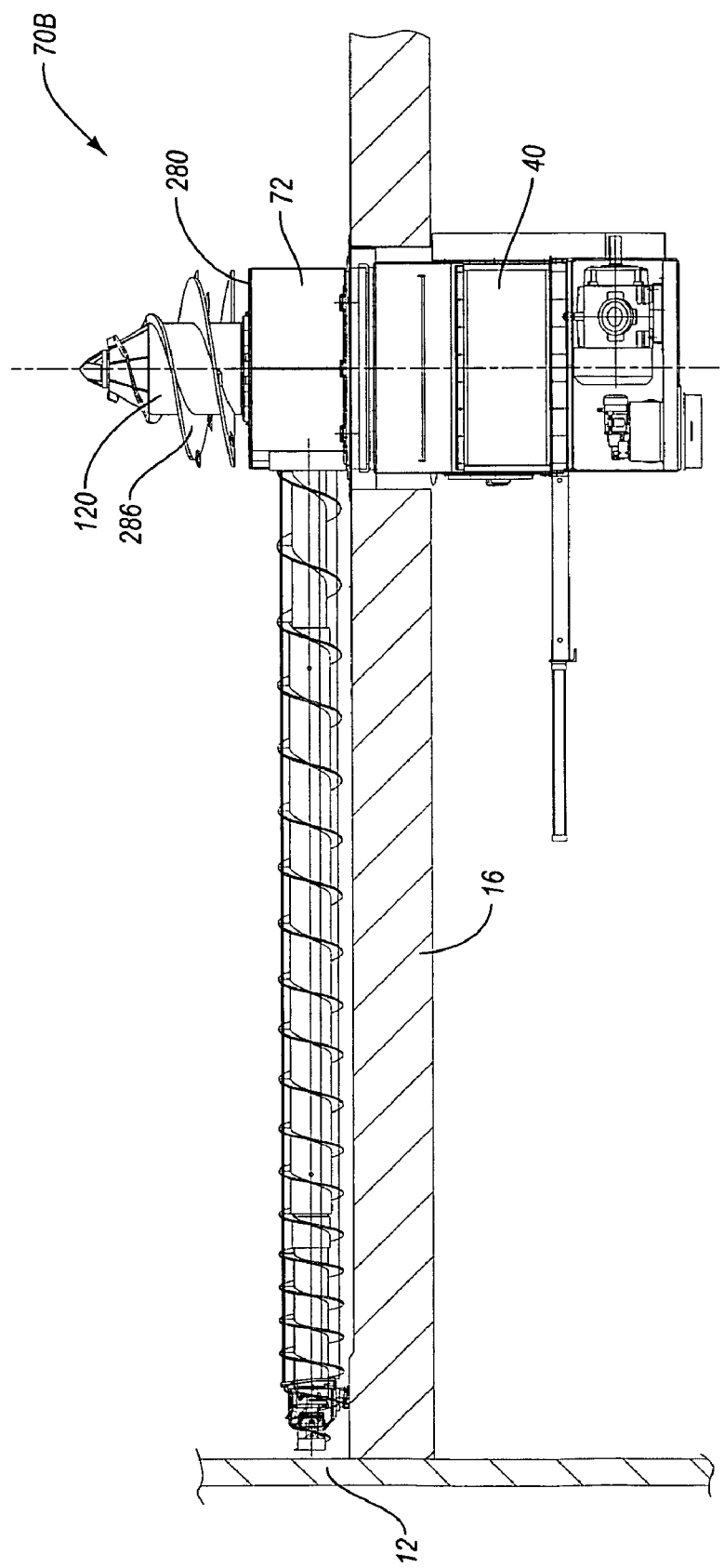
FIG. 17 is an alternative embodiment of a reclaim system having a further alternative embodiment of a dome cutter.
Figure 18:
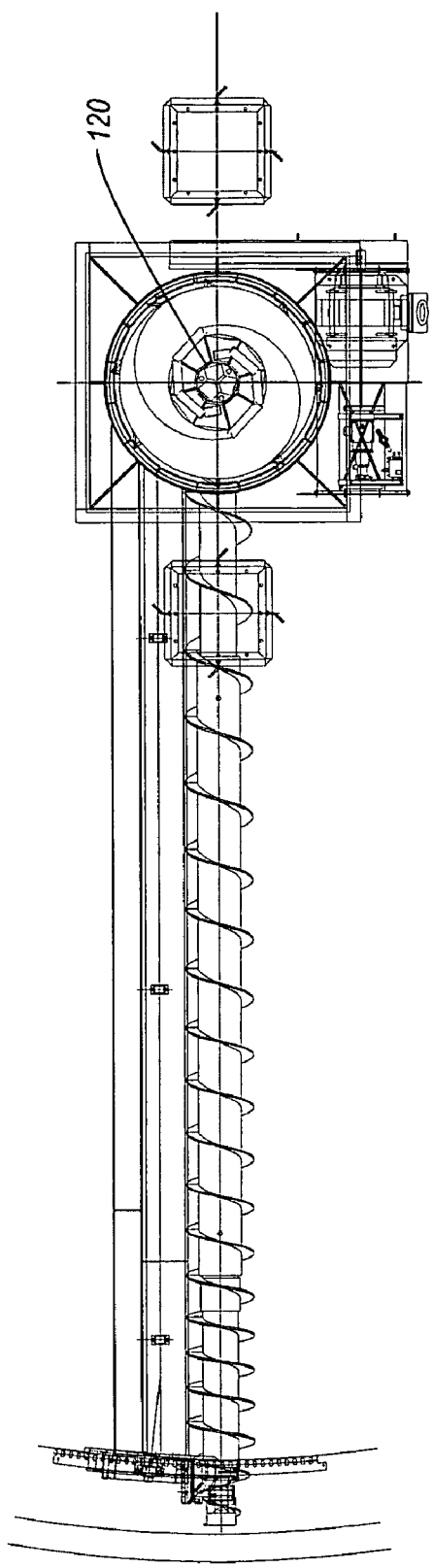
FIG. 18 is a top plan view of the reclaim system shown in FIG. 17.
Figure 19:
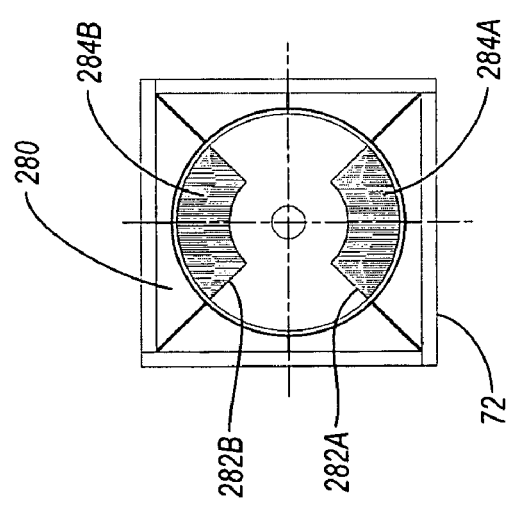
FIG. 19 is a top plan view of the roof of the cutter dome shown in FIG. 17.

Turning to FIGS. 17-19 is a further alternative embodiment of a cutter dome 70B incorporating features of the present embodiment. Again, like elements are identified by like reference characters. Cutter dome 70B comprises lower dome portions 72 having a roof 280 formed thereon. Roof 280 has a pair of openings 282A and B that are selectively opened and closed by doors 284A and B respectively. Shaft 120 centrally extends through roof 280. A flute 286 is mounted on and helically encircles the exterior surface of shaft 120. A drive mechanism disposed within lower dome portion 72 facilitates rotation of shaft 120 independent of lower dome portion 72. With doors 284A and B open, rotation of shaft 120 causes the bulk material to travel down the flute and into inlets 282A and B. The bulk material then passes from inlets 282A and B through lower dome portion 72 and into hopper 40. Flute 286 is intended to project out to the edge of roof 280 so as to preclude any posting of the bulk material on roof 280.

In any of the foregoing examples, is appreciated that upper dome portion 74 can rotate independent of lower dome portion 72. That is, upper dome portion 74 can rotate at a different speed than lower dome portion 72. Depicted in FIG. 20 is one embodiment of how to facilitate such movement between dome portions 72 and 74. In this embodiment, upper dome portion 74 connects within lower dome portion 72 on a track 290. Track 290 permits rotation of upper dome portion 74 relative to lower dome portion 72 and can comprise a smooth wear plate, race, bearing assembly or the like. An annular engagement track 292 is disposed on the interior surface of upper dome portion 74 having a plurality of teeth 294 formed thereon. A gear 296 engages teeth 294. A drive assembly 298 rotates gear 296 which in turn facilitates rotation of upper dome portion 74 relative to lower dome portion 72. In turn, however, lower dome portion 72 and drive assembly 298 rotate relative to outer structure 31 of base 26. Depicted in FIGS. 21-26 is a further alternative embodiment of an upper dome portion 310 incorporating features of the present invention. Upper dome portion 310 is similar to upper dome portion 74 shown in FIGS. 5-7 and like elements are identified by like reference numbers. It is noted that part of the upper sidewall 94 of upper dome portion 310 is removed to help show the internal structure.

Figure 21:
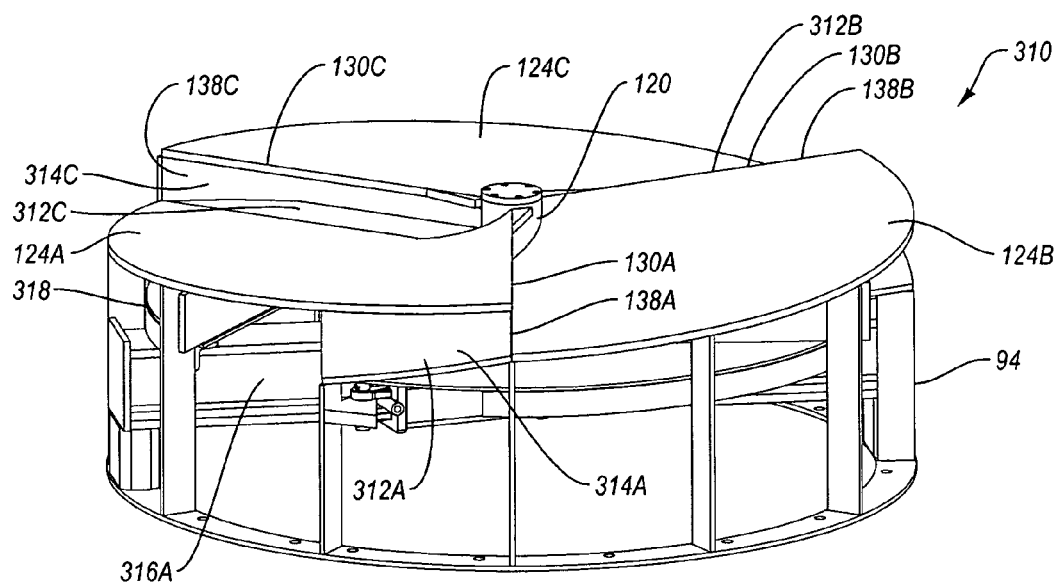
FIG. 21 is a top perspective view of an alternative embodiment of an upper dome portion with a door in an open position.
Figure 23:
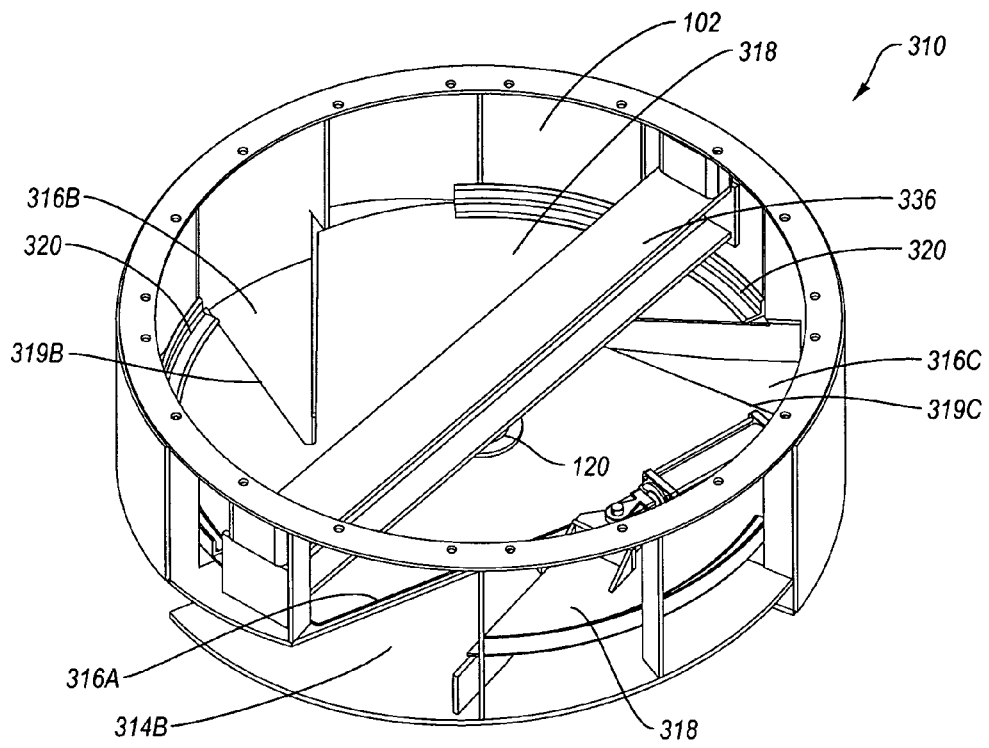
FIG. 23 is a bottom perspective view of the upper dome portion shown in FIG. 21 with the door in the open position.

Similar to upper dome portion 74, upper dome portion 310 is shown having three roof segments 124A-C and three inlets 138A-C. However, in contrast to upper dome portion 74 wherein all three of passageways 143 terminate at a common outlet 152, upper dome portion 310, as shown in FIG. 21, includes three flutes 312A-C leading from corresponding inlets 138A-C, respectively. Each flute 312 A-C extends a short distance in a downward, helical path about shaft 120 and terminates, as shown in FIG. 23, at a separate outlet 316A-C, respectively. That is, each flute 312A-C which partially bounds a corresponding passageway 314A-C terminates at a separate, isolated outlet 316A-C. Each outlet 316A-C is shown having a wedge shaped configuration and downwardly communicates with first chamber 86 of lower dome portion 72 (FIG. 4). Because passageways 314A-C are shorter than the passageways of upper dome portion 74 and each exits through its own outlet 316A-C, there is less chance of bulk material clogging within upper dome portion 310.

As with upper dome portion 74, however, it is desirable to be able to selectively close outlets 316A-C so that lower dome portion 72 can be accessed without risk of being trapped by the bulk material. To that end, a door 318 is mounted within second chamber 102 below outlets 316A-C. Door 318 is shown in the form of a circular plate having three openings 319A-C. Each opening 319A-C has a wedge shaped configuration complementary to outlets 316A-C. Door 318 centrally rotates about shaft 120 and is movably supported around it perimeter edge by supports 320 secured to upper sidewall 94. A beam 336 is shown spanning between opposing sides of upper sidewall 94 and supports shaft 120.

Figure 25:
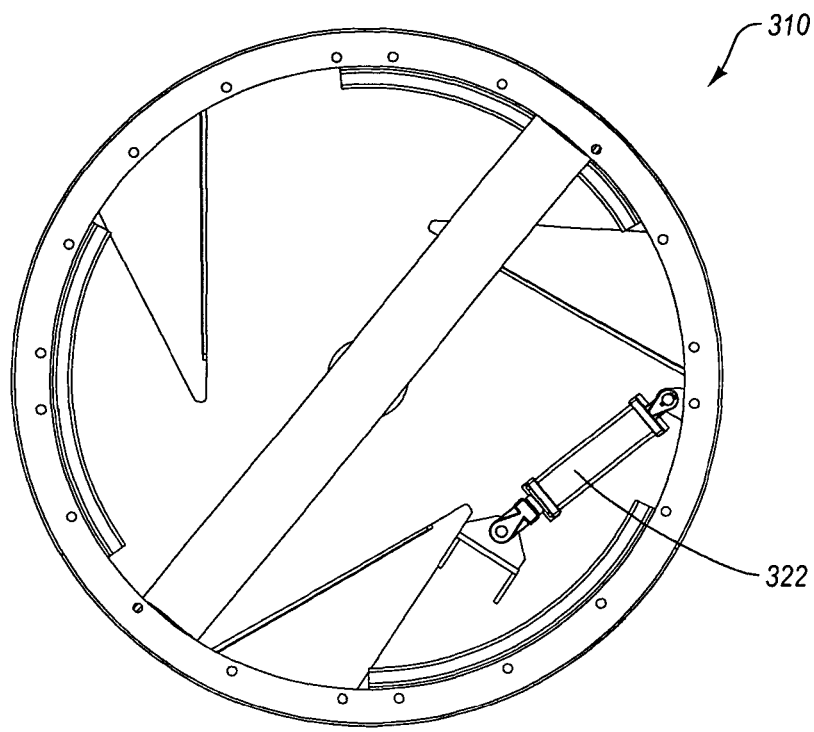
FIG. 25 is a bottom plan view of the upper dome portion shown in FIG. 21 with the door in the open position.
Figure 26:
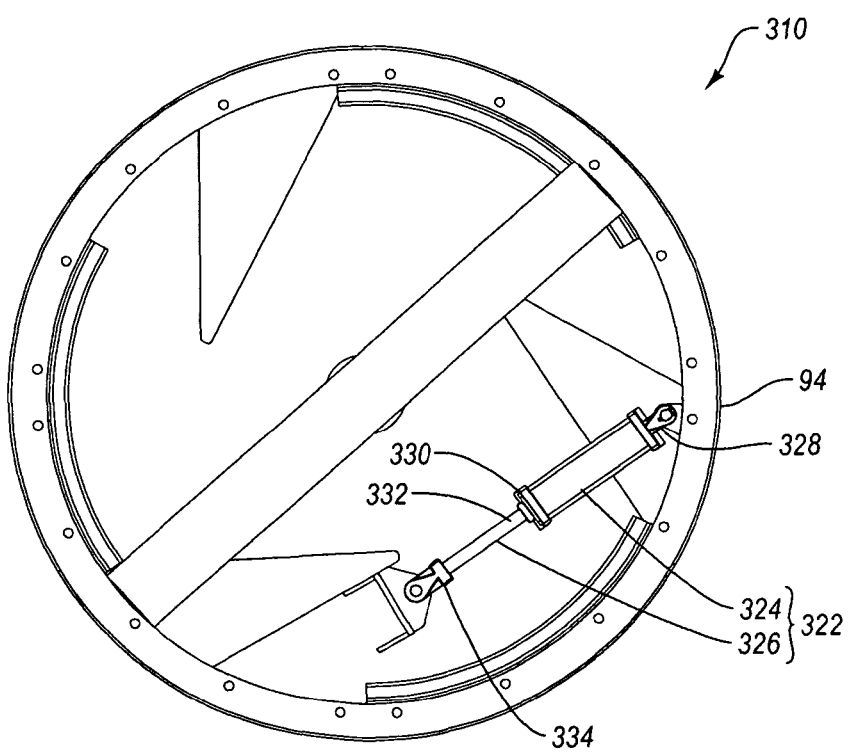
FIG. 26 is a bottom plan view of the upper dome portion shown in FIG. 25 with the door in the closed position.

As shown in FIGS. 25 and 26, door 318 is moved by an actuator 322. Actuator 322 includes a body 324 having a first end 328 hingedly mounted to upper sidewall 94 and an opposing second end 330. A piston 326 has a first end 332 slidably mounted within second end 330 of body 324 and an opposing second 334 hingedly mounted to a bottom surface of door 318. In one embodiment, actuator 322 can comprise a pneumatic or hydraulic piston. In other embodiment, actuator 322 can comprise a screw drive or any other actuator that can expand and contract.

Figure 22:
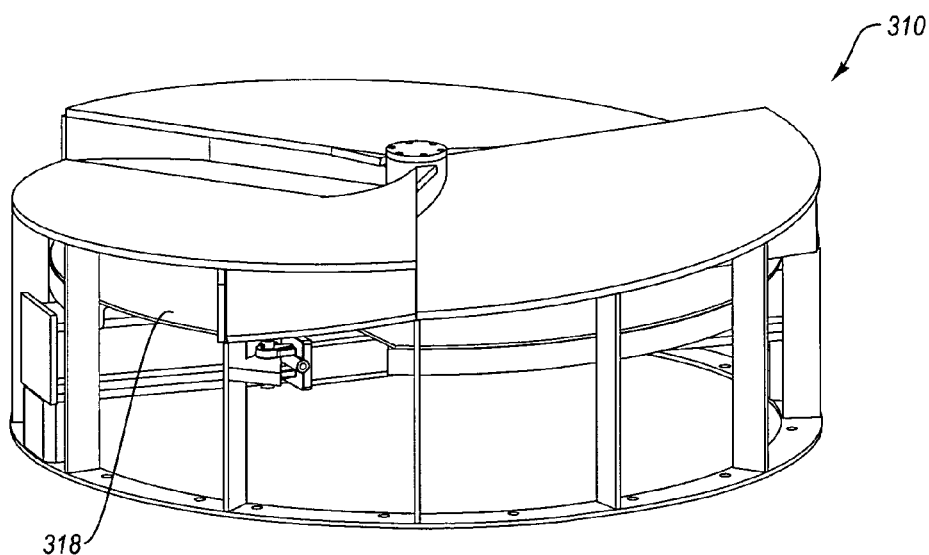
FIG. 22 is a top perspective view of the upper dome portion shown in FIG. 21 with the door in a closed position.
Figure 24:
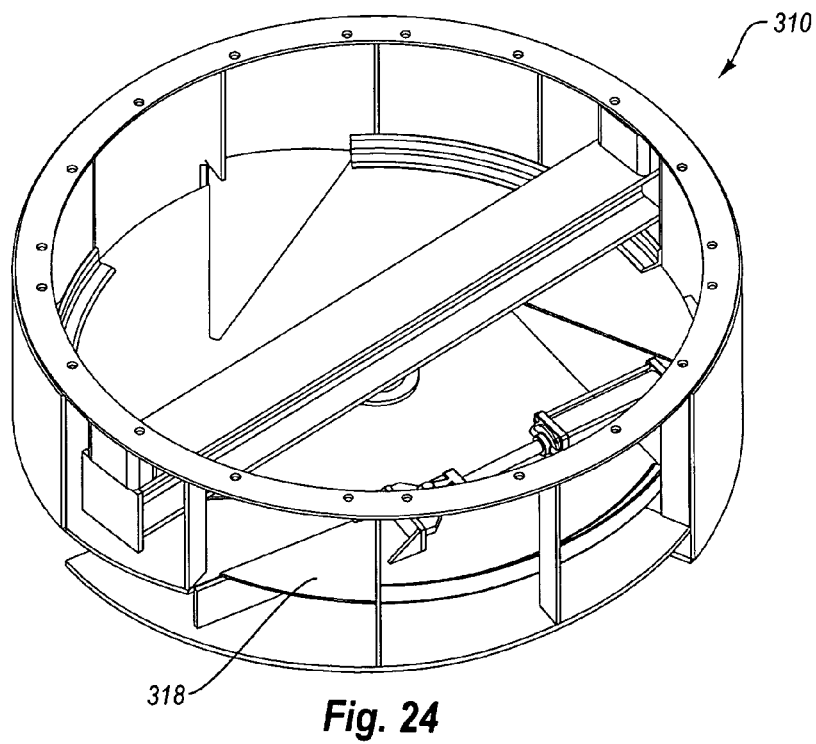
FIG. 24 is a bottom perspective view of the upper dome portion shown in FIG. 23 with the door in the closed position.

Actuator 322 and door 318 are movable between an open and closed position. In the open position as shown in FIGS. 21, 23, and 25, openings 319A-C on door 318 (FIG. 23) are aligned with outlets 316A-C, respectively, so that the bulk material can freely flow out through outlets 316A-C and into first chamber 86. Upon actuation of actuator 322, piston 326 advances out of body 324, thereby causing door 318 to rotate so that door 318 covers outlets 31 6A-C and thereby blocks the flow of bulk material out of outlets 31 6A-C, as shown in FIGS. 22, 24, and 26. Outlets 316A-C can thus be selectively opened and closed by rotating door 318 back and forth through the use of actuator 322.

As discussed above with regard to upper dome portion 74, it is appreciated that upper dome portion 310 can be formed with one, two, or four or more inlets 138 and corresponding outlets 316. Likewise, outlets 316 and openings 319 can be any number of different configurations as long as door 318 can selectively open and close outlets 316. Furthermore, single door 318 can be replaced with a separate door for each outlet 316. These doors can slide horizontally or pivot similar to door 154 (FIG. 10) to selectively open and close the separate outlets 316. A separate actuator can be used with each door.

The cutter domes disclosed herein solve the problem of eliminating (or greatly reducing) the risk of material posting at the center of the storage vessel, while at the same time prevent the unwanted free-flow of bulk material out of the storage vessel, thereby ensuring first-in-first-out (FIFO) reclamation of stored bulk material. It is appreciated that the different disclosed embodiments of the cutter dome are merely examples of the inventive cutter dome and that other embodiments can also be used. For example, different features of the different cutter domes can be mixed and matched to produce other embodiments. Furthermore, a variety of different reclaimers, hoppers, bases and drive assemblies can be used with the inventive cutter domes. It is also noted that the inventive cutter domes can be formed as part of a new reclaim system or can be retrofitted onto an existing reclaim system.

Accordingly, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A reclaimer system comprising:
a base having a passage extending therethrough;
a cutter dome having a rotational axis, the cutter dome being mounted on the base so that the cutter dome can rotate relative to at least a portion of the base about the rotational axis, the cutter dome comprising:
a sidewall that at least partially encircles the rotational axis and that extends from a lower end to an upper end, the sidewall having a lower portion that bounds a first chamber and an upper portion that bounds a second chamber, a collection opening being formed on the lower portion of the sidewall and communicating with the first chamber;
a roof disposed on the upper end of the sidewall so as to cover the second chamber, the roof having a first inlet formed thereon; and
a first passageway disposed within the second chamber and having a helical configuration that extends from the first inlet on the roof to a first outlet that communicates with the first chamber;
a reclaimer having a first end disposed within the first chamber of the cutter dome and an opposing second end disposed outside of the cutter dome, the reclaimer passing through the collection opening.

2. The reclaimer system as recited in claim 1, further comprising:
a second inlet formed on the roof; and
a second passageway disposed within the second chamber and extending from the second inlet to a second outlet, the second outlet communicating with the first chamber.

3. The reclaimer system as recited in claim 1, wherein the sidewall has an exterior surface with a substantially cylindrical configuration.

4. The reclaimer system as recited in claim 1, wherein the upper portion and the lower portion of the sidewall are fixed relative to each other.

5. The reclaimer system as recited in claim 1, wherein the roof comprises a first roof segment comprising a first inside edge disposed toward the rotational axis and a first outside edge disposed toward the sidewall, the first inside edge and the first outside edge each extending between a first cutting edge and a first back edge, the first roof segment being sloped relative to the rotational axis so that the first cutting edge is disposed higher on the rotational axis then the first back edge.

6. The reclaimer system as recited in claim 1, wherein the roof comprises:
a first roof segment comprising a first inside edge and a first outside edge each extending between a first cutting edge and a first back edge, the first inside edge extending about the rotational axis in a helical path so that the first cutting edge is disposed higher on the rotational axis then the first back edge; and
a second roof segment comprising a second inside edge and a second outside edge each extending between a second cutting edge and a second back edge, the second inside edge extending about the rotational axis in a helical path so that second cutting edge is disposed higher on the rotational axis then the second back edge, the first inlet being bounded between the first cutting edge and the second back edge.

7. The reclaimer system as recited in claim 1, further comprising a door configured to selectively open and close the first outlet that communicates between the first chamber and the second chamber.

8. The reclaimer system as recited in claim 7, wherein the door rotates about the rotational axis when moving between opening and closing the first outlet.

9. The reclaimer system as recited in claim 1, further comprising a hopper mounted to the base, the hopper having a chamber that communicates with the first chamber in the cutter dome through the passage in the base.

10. The reclaimer system as recited in claim 1, wherein the upper portion of the sidewall is rotatably mounted on the lower portion of the sidewall so that the upper portion of the sidewall, roof, and first passageway can concurrently rotate about the rotational axis relative the lower portion of the sidewall.

11. The reclaimer system as recited in claim 1, further comprising a first flute disposed within second chamber, the first flute at least partially encircling the rotational axis in a helical path and at least partially bounding the entire length of the first passageway.

12. The reclaimer system as recited in claim 11, further comprising:
a second inlet formed on the roof; and
a second flute disposed within second chamber, the second flute at least partially encircling the rotational axis in a helical path and at least partially bounding a second passageway that extends from the second inlet on the roof to the first outlet that communicates with the first chamber.

13. The reclaimer system as recited in claim 11, wherein the sidewall is mounted on the base so that the sidewall, roof, and first flute can concurrently rotate relative to at least a portion of the base, the passage of the base communicating with the first chamber.

14. The reclaimer system as recited in claim 11, further comprising a shaft disposed along the rotational axis, the first flute being secured to the shaft so as to at least partially encircle the shaft in the helical path.

15. The reclaimer system as recited in claim 1, further comprising:
a first door configured to selectively open and close the collection opening; and
a second door configured to selectively open and close the outlet that communicates between the first chamber and the second chamber.

16. The reclaimer system as recited in claim 1, wherein the reclaimer comprises an auger.

17. The reclaimer system as recited in claim 1, further comprising:
second inlet formed on the roof;
a second passageway disposed within the second chamber that extends from the second inlet on the roof to a second outlet that communicates with the first chamber; and
a door that opens and closes the first passageway and the second passageway.

18. The reclaimer system as recited in claim 1, wherein the first passageway having the helical configuration at least partially encircles the rotational axis.

19. A reclaimer system comprising:
a cutter dome having a rotational axis, the cutter dome comprising:
a sidewall that at least partially encircles the rotational axis and that extends from a lower end to an upper end, the sidewall bounding a chamber, a collection opening being formed on the sidewall and communicating with the chamber; and
a roof mounted on the upper end of the sidewall, the roof having a first inlet formed thereon; and
a shaft projecting from the roof; and a first flute secured to and at least partially encircling the shaft in a helical configuration so that the first flute bounds a helical path, the helical path communicating with the first inlet on the roof; and a reclaimer having a first end disposed within the chamber of the cutter dome and an opposing second end disposed outside of the cutter dome, the reclaimer passing through the collection opening.

20. The reclaimer system as recited in claim 19, wherein the shaft outwardly projects above the roof and the flute extends radially outward from the shaft so as to cover the first inlet on the roof.

21. The reclaimer system as recited in claim 19, wherein the reclaimer comprises an auger.

22. The reclaimer system as recited in claim 19, wherein the first flute completely encircles the shaft in a helical configuration.

23. A reclaimer system comprising:
a base having a passage extending therethrough;
a cutter dome having a rotational axis, the cutter dome being mounted on the base so that the cutter dome can rotate relative to at least a portion of the base about the rotational axis, the cutter dome comprising:
  a sidewall that at least partially encircles the rotational axis and that extends from a lower end to an upper end, the sidewall having a lower portion that bounds a first chamber and an upper portion that bounds a second chamber, a collection opening being formed on the lower portion of the sidewall and communicating with the first chamber;
  a roof disposed on the upper end of the sidewall so as to cover the second chamber, the roof having a first inlet formed thereon, the roof comprising a first roof segment comprising a first inside edge disposed toward the rotational axis and a first outside edge disposed toward the sidewall, the first inside edge and the first outside edge each extending between a first cutting edge and a first back edge, the first roof segment being sloped relative to the rotational axis so that the first cutting edge is disposed higher on the rotational axis then the first back edge; and
  a first passageway disposed within the second chamber that extends from the first inlet on the roof to a first outlet that communicates with the first chamber;
a reclaimer having a first end disposed within the first chamber of the cutter dome and an opposing second end disposed outside of the cutter dome, the reclaimer passing through the collection opening.

24. A reclaimer system comprising:
a base having a passage extending therethrough;
a cutter dome having a rotational axis, the cutter dome being mounted on the base so that the cutter dome can rotate relative to at least a portion of the base about the rotational axis, the cutter dome comprising:
  a sidewall that at least partially encircles the rotational axis and that extends from a lower end to an upper end, the sidewall having a lower portion that bounds a first chamber and an upper portion that bounds a second chamber, a collection opening being formed on the lower portion of the sidewall and communicating with the first chamber;
  a roof disposed on the upper end of the sidewall so as to cover the second chamber, the roof having a first inlet formed thereon;
  a first passageway disposed within the second chamber that extends from the first inlet on the roof to a first outlet that communicates with the first chamber;
  a first door configured to selectively open and close the collection opening; and
  a second door configured to selectively open and close the first outlet that communicates between the first chamber and the second chamber;
a reclaimer having a first end disposed within the first chamber of the cutter dome and an opposing second end disposed outside of the cutter dome, the reclaimer passing through the collection opening.

* * * * *